(12) United States Patent
Nakada et al.

(10) Patent No.: US 9,683,148 B2
(45) Date of Patent: Jun. 20, 2017

(54) ADHESIVE CONTAINING BLOCK COPOLYMER

(71) Applicant: KURARAY CO., LTD., Kurashiki-shi (JP)

(72) Inventors: Kanayo Nakada, Tsukuba (JP); Yoshihiro Morishita, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/890,336

(22) PCT Filed: May 9, 2014

(86) PCT No.: PCT/JP2014/062465
§ 371 (c)(1),
(2) Date: Nov. 10, 2015

(87) PCT Pub. No.: WO2014/185350
PCT Pub. Date: Nov. 20, 2014

(65) Prior Publication Data
US 2016/0122603 A1    May 5, 2016

(30) Foreign Application Priority Data
May 13, 2013 (JP) .................. 2013-101297

(51) Int. Cl.
*C08F 297/02* (2006.01)
*C08F 4/52* (2006.01)
*C09J 153/00* (2006.01)
*C08F 293/00* (2006.01)

(52) U.S. Cl.
CPC .............. *C09J 153/00* (2013.01); *C08F 4/52* (2013.01); *C08F 293/005* (2013.01); *C08F 297/026* (2013.01)

(58) Field of Classification Search
None
See application file for complete search history.

(56) References Cited

U.S. PATENT DOCUMENTS

| | | | |
|---|---|---|---|
| 5,403,658 A | 4/1995 | Southwick et al. | |
| 6,329,480 B1 | 12/2001 | Uchiumi et al. | |
| 7,893,163 B2 | 2/2011 | Guerret | |
| 2002/0032290 A1 | 3/2002 | Uchiumi et al. | |
| 2004/0034183 A1 | 2/2004 | Kato et al. | |
| 2005/0182182 A1 | 8/2005 | Morishita et al. | |
| 2006/0058467 A1 | 3/2006 | Guerret | |
| 2006/0084755 A1 | 4/2006 | Good et al. | |
| 2010/0010103 A1* | 1/2010 | Schmidt ........... | A61K 47/48176 514/772.1 |
| 2011/0172352 A1 | 7/2011 | Magnet et al. | |
| 2011/0230609 A1 | 9/2011 | Oshita et al. | |

FOREIGN PATENT DOCUMENTS

| | | |
|---|---|---|
| CN | 1643014 A | 7/2005 |
| CN | 102307964 A | 1/2012 |
| JP | 05-507737 A | 11/1993 |
| JP | 06-093060 A | 4/1994 |
| JP | 11-335432 A | 12/1999 |
| JP | 2002-533556 | 10/2002 |
| JP | 2004-002736 A | 1/2004 |
| JP | 2006-509882 A | 3/2006 |
| JP | 2006-117932 A | 5/2006 |
| JP | 2012-503062 A | 2/2012 |
| KR | 10-2005-0084471 A | 8/2005 |
| KR | 10-2009-0096479 A | 9/2009 |
| WO | WO 91/00874 A1 | 1/1991 |
| WO | WO 00/39233 A1 | 7/2000 |
| WO | WO 02/26847 A1 | 4/2002 |
| WO | WO 2012/132115 A1 | 10/2012 |

OTHER PUBLICATIONS

International Search Report issued Aug. 12, 2014, in PCT/JP2014/062465 filed May 9, 2014.
Aymonier, A. et al., "Control of Structure and Tack Properties of Acrylic Pressure-Sensitive Adhesives Designed by a Polymerization Process", Journal of Applied Polymer Science, vol. 89, pp. 2749-2756, (2003).
Buzin, A.I. et al., Calorimetric study of block-copolymers of poly(n-butyl acrylate) and gradient poly(n-butyl acrylate-*co*-methyl methacrylate), Polymer, vol. 43, pp. 5563-5569, (2002).
Laureau, C. et al., "Effect of the Composition Profile of 2-Ethyl Hexyl Acrylate/Methyl Methacrylate Latex Particles on Adhesion", Journal of Applied Polymer Science, vol. 81, pp. 1258-1265, (2001).
Brar, A.S. et al., "Microstructure Determination of Methyl Methacrylate and n-Butyl Acrylate Copolymers Synthesized by Atom Transfer Radical Polymerization with Two-Dimensional NMR Spectroscopy", Journal of Polymer Science: Part A: Polymer Chemistry, vol. 43, pp. 1100-1118, (2005).

(Continued)

*Primary Examiner* — Irina S Zemel
*Assistant Examiner* — Jeffrey Lenihan
(74) *Attorney, Agent, or Firm* — Oblon, McClelland, Maier & Neustadt, L.L.P.

(57) ABSTRACT

An adhesive containing a block copolymer having at least one structure represented by formula: -[A1]-[B/A2]-, where [A1] represents a polymer block composed of a structural unit derived from a methacrylic acid ester (A1), [B/A2] represents a copolymer block composed of a structural unit derived from an acrylic acid ester (B) and a structural unit derived from a methacrylic acid ester (A2), and the copolymer block [B/A2] has a gradient copolymer block section in which a copolymerization ratio of the methacrylic acid ester (A2) continuously increases from a section connected to the polymer block [A1]. The block copolymer has a total content of the structural units derived from the methacrylic acid ester (A1) and the methacrylic acid ester (A2) of 5% to 60% by mass, a weight-average molecular weight (Mw) of 30,000 to 300,000, and a molecular weight distribution (Mw/Mn) of 1.0 to 1.5.

16 Claims, 3 Drawing Sheets

(56) References Cited

OTHER PUBLICATIONS

Moineau, G. et al., "Synthesis of fully acrylic thermoplastic elastomers by atom transfer radical polymerization (ATRP), 2a and Effect of the catalyst on the molecular control and the rheological properties of the triblock copolymers", Macromoleculary Chemistry and Physics, vol. 201, No. 11, pp. 1108-1114, (2000).
Office Action issued Dec. 19, 2016 in Korean Patent Application No. 10-2015-7034464.
Combined Office action and Search Report issued Jul. 18, 2016 in Chinese Patent Application No. 201480027280.3.

\* cited by examiner

POLYMERIZATION CONVERSION RATIOS OF METHYL METHACRYLATE AND n-BUTYL ACRYLATE WITH TIME

MMA n-BA

FIG. 2 $^{13}$C-NMR SPECTRUM OF BLOCK COPOLYMER (I-1)
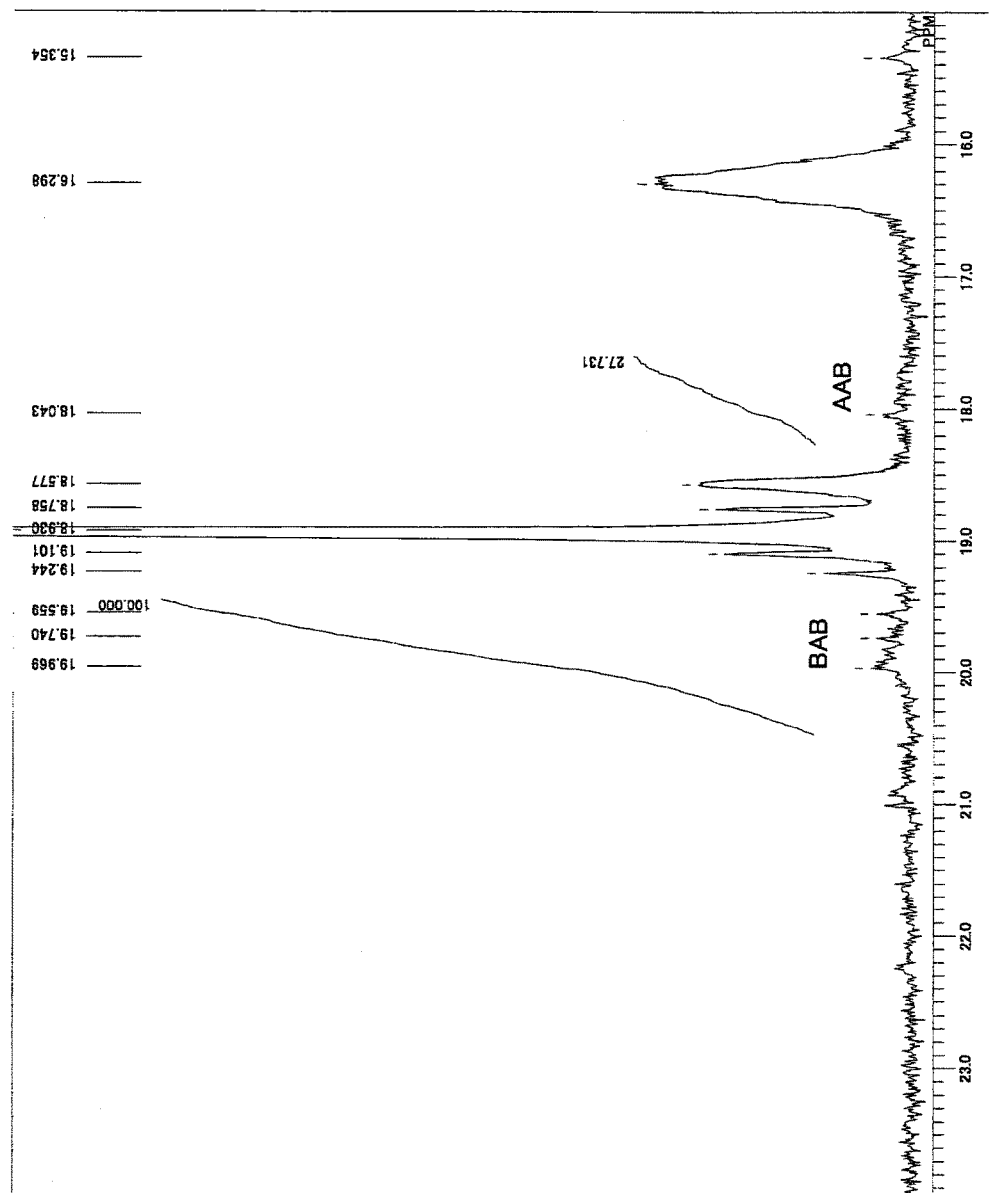

SF-2793
FIG. 3 $^{13}$C-NMR SPECTRUM OF BLOCK COPOLYMER (C-5)
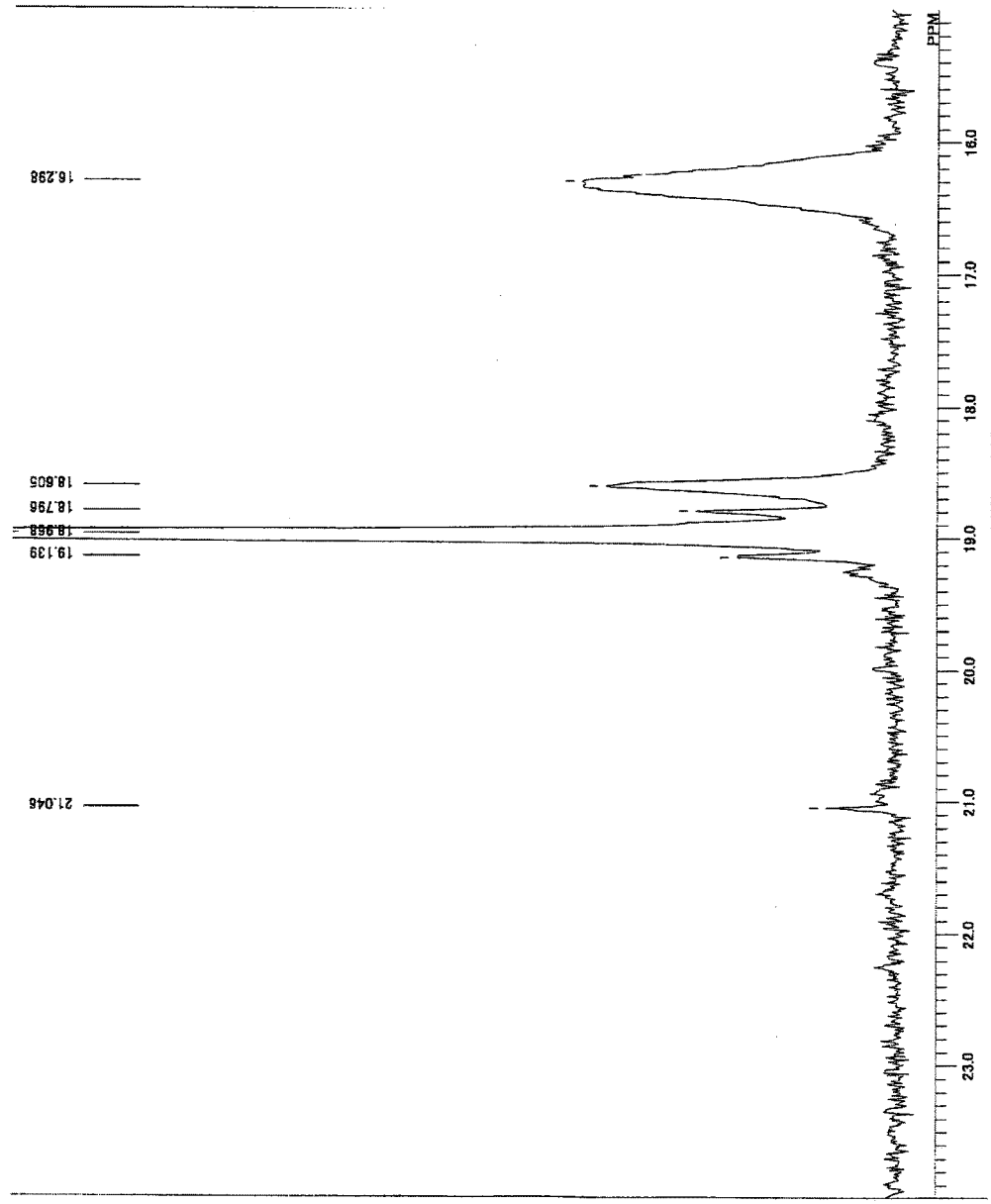

ADHESIVE CONTAINING BLOCK COPOLYMER

TECHNICAL FIELD

The present invention relates to an adhesive. More specifically, the present invention relates to an adhesive containing a block copolymer having a particular gradient copolymer block. The adhesive of the present invention has good melt processability, high holding power, and good tack and wettability and thus is particularly suitable for use as a hot-melt-type adhesive.

BACKGROUND ART

Acrylic adhesives are more widely used than rubber adhesives in adhesive products such as optical films, protective films, labels, medical tapes, and industrial tapes using features such as good weather resistance and transparency due to the chemical structures. In general, acrylic adhesives are mainly classified into solution-type adhesives, emulsion-type adhesives, and hot-melt-type adhesives on the basis of the form thereof. Recently, ultraviolet (UV)-curable adhesives that are made to react by irradiation with UV rays after coating have also been developed.

Herein, the term "adhesive" refers to "pressure-sensitive adhesive". The term "pressure-sensitive adhesive" refers to an adhesive which is a semi-solid having a high viscosity and a low modulus of elasticity, whose state does not change after joining, and which can be attached and detached again. The "pressure-sensitive adhesive" is usually subjected to interfacial peeling and has a high initial tack.

Solution-type adhesive/bonding agents are obtained by dissolving an adhesive/bonding component in an organic solvent. Such a solution-type adhesive/bonding agent is applied onto a base and an organic solvent is evaporated to form an adhesive/bonding agent layer on the base. Therefore, the effect of organic solvents used on the environment has been regarded as a problem. Emulsion-type adhesive/bonding agents are obtained by dispersing an adhesive/bonding component in water in the form of fine particles. Such an emulsion-type adhesive/bonding agent is applied onto a base and water is evaporated to form an adhesive/bonding agent layer on the base. Therefore, the use of a wastewater treatment and large drying energy has been regarded as a problem. Regarding UV-curable adhesive/bonding agents, for example, a liquid prepared by mixing an oligomer, a monomer, and a photoinitiator is applied onto a base, and the monomer is polymerized by irradiating the base with UV to form an adhesive/bonding agent layer. Accordingly, some of the monomer may remain, resulting in problems of the odor and toxicity. In contrast, regarding hot-melt-type adhesive/bonding agents, an adhesive component itself is applied onto a base in a thermally melted state to form an adhesive/bonding agent layer on the base. Therefore, a step of drying an organic solvent or water is not necessary, and thus such hot-melt-type adhesive/bonding agents have high productivity of adhesive products, a low environmental load, and high safety. However, since hot-melt-type adhesive/bonding agents melt when heat is applied, they have a shortcoming of a low holding power at a high temperature or under the application of a load for a long time.

Examples of reports of past examinations for obtaining an acrylic hot-melt-type adhesive that can improve the shortcoming of a low holding power include the following.

Patent literature 1 reports a hot-melt-type adhesive (pressure-sensitive adhesive composition) that uses an acrylic triblock copolymer. This report describes that since a tapered structure is not contained, the degree of freedom of the composition of the hot-melt-type adhesive is not impaired, and a cohesive strength does not decrease. However, there may be problems in terms of hot-melt processability and adhesive performance.

Patent literature 2 reports a hot-melt-type adhesive containing a particular acrylic diblock copolymer. This report describes that, by combining a particular acrylic diblock copolymer with an acrylic triblock copolymer, hot-melt processability can be enhanced while suppressing a decrease in the holding power. However, in the case where priority is given to hot-melt processability, in particular, in the case where hot-melt coating is performed at a low temperature and at a high speed, there is a room for improvement in the holding power, etc.

Patent literature 3 reports a reactive hot-melt-type bonding agent containing an isocyanate and an acrylic block copolymer. This report describes that the presence of a gradient structure between blocks decreases a green strength and increases an open time. However, since this bonding agent is a reactive bonding agent, after the bonding agent is attached to an adherend, it reacts and is bonded to the adherend, and adhesiveness is lost after the reaction. Accordingly, this bonding agent cannot be used in applications to adhesive products that are detached again, for example, tapes and labels (i.e., applications as adhesives).

Herein, the term "bonding agent" refers to an agent for which a solidification step is necessary after the agent is joined to an adherend, which exhibits a high bonding property after the joining, and which is difficult to detach again. Thus, the "bonding agent" is clearly distinguished from the "adhesive" described above. The "bonding agent" covers a "heat-sensitive bonding agent", a reactive/UV-curable bonding agent, etc., and it is known that a bonding agent that causes cohesive failure when detached is preferable. The "bonding agent" and the "adhesive" are fundamentally different in terms of applications thereof. Using the "bonding agent" in applications of the "adhesive" is not suitable.

CITATION LIST

Patent Literature

Patent literature 1: JPT 2002-533556
Patent literature 2: JPA 2004-2736
Patent literature 3: JPA 2006-117932
Patent literature 4: JPA 1994-93060
Patent literature 5: JPT 1993-507737
Patent literature 6: JPA 1999-335432
Patent literature 7: U.S. Pat. No. 5,403,658

Non Patent Literature

Non-patent literature 1: Journal of Polymer Science: Part A: Polymer Chemistry, 2005, vol. 43, pp. 1100-1118
Non-patent literature 2: Macromolecular Chemistry and Physics, 2000, vol. 201, pp. 1108-1114

SUMMARY OF INVENTION

Technical Problem

Accordingly, an object of the present invention is to provide an acrylic hot-melt-type adhesive that can combine melt processability and holding power, that is suitable for applications to a hot-melt coating method in which coating is performed at a relatively low temperature at a high speed, that has good transparency and weather resistance, and that further has good adhesiveness at low temperatures, and a block copolymer suitable for use in the adhesive.

Solution to Problem

According to the present invention, the above object is achieved by providing the following.

[1] An adhesive containing a block copolymer having at least one structure represented by a general formula (I) below:

-[A1]-[B/A2]-  (I)

(where, in the formula (I), [A1] represents a polymer block composed of a structural unit derived from a methacrylic acid ester (A1), [B/A2] represents a copolymer block composed of a structural unit derived from an acrylic acid ester (B) and a structural unit derived from a methacrylic acid ester (A2), and the copolymer block [B/A2] has a gradient copolymer block section in which a copolymerization ratio of the methacrylic acid ester (A2) continuously increases from a section connected to the polymer block [A1]), and having a total content of the structural units derived from the methacrylic acid ester (A1) and the methacrylic acid ester (A2) of 5% to 60% by mass, a weight-average molecular weight (Mw) of 30,000 to 300,000, and a molecular weight distribution (Mw/Mn) of 1.0 to 1.5.

[2] The adhesive according to item [1], in which the block copolymer is represented by a general formula (II) below:

[A1]-[B/A2]  (II)

[3] The adhesive according to item [1] or [2], in which, in the block copolymer, a ratio of a monomer sequence distribution represented by a general formula (III) below is 0.10 to 0.70:

AAB/(AAB+BAB)  (III)

(where, in the formula, AAB represents a ratio of a triad monomer sequence of methacrylic acid ester (A)-methacrylic acid ester (A)-acrylic acid ester (B) in the block copolymer, and BAB represents a ratio of a triad monomer sequence of acrylic acid ester (B)-methacrylic acid ester (A)-acrylic acid ester (B) in the block copolymer.)

[4] The adhesive according to any one of items [1] to [3], in which the block copolymer forms a microphase separation structure.

[5] The adhesive according to any one of items [1] to [4], in which the polymer block [A1] has a glass transition temperature of 100° C. or higher, and the copolymer block [B/A2] has a glass transition temperature of 10° C. or lower.

[6] The adhesive according to any one of items [1] to [5], in which the total content of the structural units derived from the methacrylic acid ester (A1) and the methacrylic acid ester (A2) is 5% to 32% by mass.

[7] The adhesive according to any one of items [1] to [6], in which the molecular weight distribution (Mw/Mn) is 1.0 to 1.3.

[8] The adhesive according to any one of items [1] to [7], in which the methacrylic acid ester (A1) and the methacrylic acid ester (A2) are each methyl methacrylate.

[9] The adhesive according to any one of items [1] to [8], in which the acrylic acid ester (B) is a monomer selected from the group consisting of methyl acrylate, ethyl acrylate, n-butyl acrylate, 2-ethylhexyl acrylate, isooctyl acrylate, n-octyl acrylate, and a mixture thereof

[10] The adhesive according to item [9], in which the acrylic acid ester (B) is a monomer mixture of two or more selected from the group consisting of methyl acrylate, ethyl acrylate, n-butyl acrylate, 2-ethylhexyl acrylate, isooctyl acrylate, and n-octyl acrylate.

[11] The adhesive according to any one of items [1] to [10], in which the polymer block [A1] has a triad syndiotacticity (rr) of 65% or more.

[12] The adhesive according to any one of items [1] to [11], wherein the block copolymer is obtained by anionic polymerization in the presence of an organoaluminum compound.

[13] A block copolymer being the block copolymer contained in the adhesive according to any one of items [1] to [12].

Advantageous Effects of Invention

The adhesive of the present invention can combine melt processability and holding power, and has good weather resistance, heat resistance, adhesiveness at low temperatures, and transparency. According to the present invention, it is possible to provide an adhesive and an adhesive product for which a hot-melt coating method, which does not require a step of drying an organic solvent or water and is advantageous in terms of energy saving and resource saving, can be employed as an adhesive processing method and which has good adhesive performance for a long period of time even in the environment where they are exposed to UV rays or even under the use environmental conditions at low temperatures.

BRIEF DESCRIPTION OF DRAWINGS

FIG. 2 is a chart showing a $^{13}$C-NMR spectrum of a block copolymer (I-1) prepared in Synthesis Example 1.

FIG. 3 is a chart showing a $^{13}$C-NMR spectrum of a block copolymer (C-5) prepared in Synthesis Example 10.

DESCRIPTION OF EMBODIMENTS

Figure 1A:
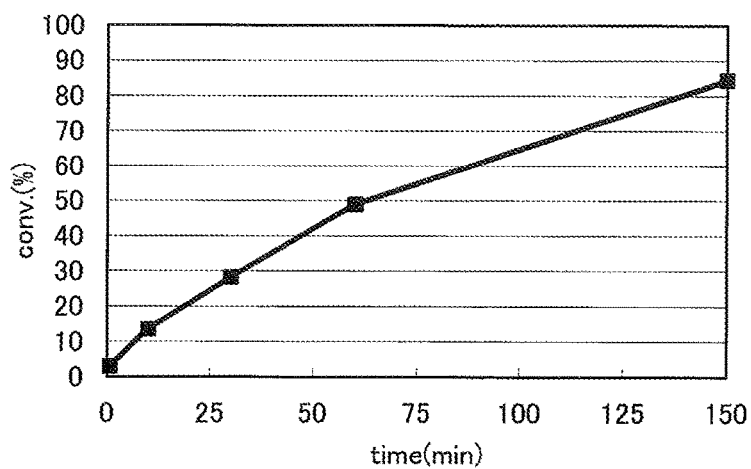
FIG. 1A and FIG. 1B include graphs showing polymerization conversion ratios of methyl methacrylate and n-butyl acrylate with time.

The present invention will now be described in detail. Herein, the term "(meth)acrylic acid ester" is a general term of "methacrylic acid ester" and "acrylic acid ester", and the term "(meth)acrylic" is a general term of "methacrylic" and "acrylic".

A block copolymer used in the present invention has at least one structure represented by a general formula (I) below:

-[A1]-[B/A2]-  (I)

(where, in the formula (I), [A1] represents a polymer block composed of a structural unit derived from a methacrylic acid ester (A1), [B/A2] represents a copolymer block composed of a structural unit derived from an acrylic acid ester (B) and a structural unit derived from a methacrylic acid ester (A2), and the copolymer block [B/A2] has a gradient copolymer block section in which a copolymerization ratio of the methacrylic acid ester (A2) continuously increases from a section connected to the polymer block [A1]), and has a total content of the structural units derived from the methacrylic acid ester (A1) and the methacrylic acid ester (A2) of 5% to 60% by mass, a weight-average molecular weight (Mw) of 30,000 to 300,000, and a molecular weight distribution (Mw/Mn) of 1.0 to 1.5.

Herein, the methacrylic acid ester (A1) and the methacrylic acid ester (A2) may be generically referred to as a methacrylic acid ester (A).

The polymer block [A1] is a polymer block composed of a structural unit derived from a methacrylic acid ester (A1) and obtained by polymerizing the methacrylic acid ester (A1). Examples of the methacrylic acid ester (A1) include methacrylic acid esters having no functional group, such as methyl methacrylate, ethyl methacrylate, n-propyl methacrylate, isopropyl methacrylate, n-butyl methacrylate, isobutyl methacrylate, sec-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, phenyl methacrylate, and benzyl methacrylate; and methacrylic acid esters having a functional group, such as methoxyethyl methacrylate, ethoxyethyl methacrylate, diethylaminoethyl methacrylate, 2-hydroxyethyl methacrylate, 2-aminoethyl methacrylate, glycidyl methacrylate, and tetrahydrofurfuryl methacrylate.

Of these, methacrylic acid esters having no functional group are preferable, and methyl methacrylate, ethyl methacrylate, propyl methacrylate, and isopropyl methacrylate are more preferable from the viewpoint that decomposition or gelation does not easily occur when the resulting adhesive is melted. Methyl methacrylate is still more preferable from the viewpoint that microphase separation between the polymer block [A1] and the copolymer block [B/A2] becomes clear and the resulting adhesive exhibits a high holding power. The polymer block [A1] may be formed of one of these methacrylic acid esters (A1) or two or more of these methacrylic acid esters (A1).

A ratio of the methacrylic acid ester (A1) unit contained in the polymer block [A1] is preferably 60% by mass or more and 100% by mass or less, more preferably 80% by mass or more and 100% by mass or less, and still more preferably 90% by mass or more and 100% by mass or less in the polymer block [A1].

The copolymer block [B/A2] is a copolymer block composed of a structural unit derived from an acrylic acid ester (B) and a structural unit derived from a methacrylic acid ester (A2) and obtained by copolymerizing the acrylic acid ester (B) and the methacrylic acid ester (A2).

Examples of the acrylic acid ester (B) include acrylic acid esters having no functional group, such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, n-octyl acrylate, isooctyl acrylate, decyl acrylate, isobornyl acrylate, lauryl acrylate, stearyl acrylate, phenyl acrylate, and benzyl acrylate; and acrylic acid esters having a functional group, such as methoxyethyl acrylate, ethoxyethyl acrylate, phenoxyethyl acrylate, diethylaminoethyl acrylate, 2-hydroxyethyl acrylate, 2-aminoethyl acrylate, glycidyl acrylate, and tetrahydrofurfuryl acrylate.

Of these, acrylic acid esters having no functional group are preferable as the acrylic acid ester (B) from the viewpoint that decomposition or gelation does not easily occur when the resulting adhesive is melted. Methyl acrylate, ethyl acrylate, n-butyl acrylate, 2-ethylhexyl acrylate, isooctyl acrylate, and n-octyl acrylate are more preferable from the viewpoint of improving flexibility, and cold resistance of the resulting adhesive. These may be used alone or in combination of two or more compounds.

From the viewpoint of obtaining good adhesive properties (such as tack and adhesive strength) of the resulting adhesive at low temperatures (10° C. to −40° C.) and exhibiting high adhesive strength, two or more selected from methyl acrylate, ethyl acrylate, n-butyl acrylate, 2-ethylhexyl acrylate, isooctyl acrylate, and n-octyl acrylate are more preferably used in combination. In particular, the combined use of n-butyl acrylate and 2-ethylhexyl acrylate is still more preferable from the viewpoint that the adhesive strength is high and the resulting adhesive exhibits a high holding power because microphase separation between the polymer block [A1] and the copolymer block [B/A2] becomes clear.

Examples of the methacrylic acid ester (A2) include methacrylic acid esters the same as those exemplified as the methacrylic acid ester (A1).

In particular, from the viewpoint that decomposition or gelation does not easily occur when the resulting adhesive is melted, methacrylic acid esters having no functional group are preferable, and methyl methacrylate, ethyl methacrylate, propyl methacrylate, and isopropyl methacrylate are more preferable. As the methacrylic acid ester (A2), these methacrylic acid esters may be used alone or in combination of two or more compounds. The methacrylic acid ester (A2) and the methacrylic acid ester (A1) may be the same or different. When the methacrylic acid ester (A2) and the methacrylic acid ester (A1) are the same, both hot-melt coating properties and holding power of the resulting adhesive can be combined. In particular, the case where the methacrylic acid ester (A1) and the methacrylic acid ester (A2) are each methyl methacrylate is preferable from the viewpoint that the holding power can be further enhanced.

A ratio of the total of the acrylic acid ester (B) unit and the methacrylic acid ester (A2) unit in the copolymer block [B/A2] is preferably 60% by mass or more and 100% by mass or less, more preferably 80% by mass or more and 100% by mass or less, and still more preferably 90% by mass or more and 100% by mass or less in the copolymer block [B/A2].

The copolymer block [B/A2] has a gradient copolymer block section in which a copolymerization ratio of the methacrylic acid ester (A2) continuously increases from a section connected to the polymer block [A1]. Specifically, in a section in the vicinity of the section connected to the polymer block [A1], the copolymer block [B/A2] has a copolymer section having a low copolymerization ratio of the methacrylic acid ester (A2) and a high copolymerization ratio of the acrylic acid ester (B). Furthermore, in a section apart from the section connected to the polymer block [A1], the copolymer block [B/A2] has a copolymer section having a high copolymerization ratio of the methacrylic acid ester (A2) and a low copolymerization ratio of the acrylic acid ester (B). The copolymer block [B/A2] may be composed of only this gradient copolymer block. Alternatively, a copolymer section derived from only the methacrylic acid ester (A2) may be subsequently connected to the gradient copolymer block. The copolymerization ratio of the methacrylic acid ester (A2) in the copolymer block [B/A2] may linearly increase with an increase in the degree of polymerization from the vicinity of the section connected to the [A1] to the end apart from the connecting section. Alternatively, the copolymerization ratio of the methacrylic acid ester (A2) in the copolymer block [B/A2] may initially rapidly increase and then slowly increase. Alternatively, the copolymerization ratio of the methacrylic acid ester (A2) in the copolymer block [B/A2] may initially slowly increase and then rapidly increase.

From the viewpoint of the balance between melt processability and holding power, the block copolymer used in the present invention is preferably a block copolymer represented by a general formula (II) below:

[A1]-[B/A2]    (II)

The block copolymer used in the present invention has the gradient copolymer block section described above and thus has a triad monomer sequence "AAB" of methacrylic acid ester (A)-methacrylic acid ester (A)-acrylic acid ester (B) and a triad monomer sequence "BAB" of acrylic acid ester (B)-methacrylic acid ester (A)-acrylic acid ester (B). In the block copolymer used in the present invention, from the viewpoint that hot-melt coating properties and holding power can be combined, a ratio of a monomer sequence distribution represented by a general formula (III) below is preferably 0.10 to 0.70, more preferably 0.13 to 0.50, and still more preferably 0.15 to 0.45.

AAB/(AAB+BAB)    (III)

(In the formula, AAB represents a ratio of the triad monomer sequence of methacrylic acid ester (A)-methacrylic acid ester (A)-acrylic acid ester (B) in the block copolymer, and BAB represents a ratio of the triad monomer sequence of acrylic acid ester (B)-methacrylic acid ester (A)-acrylic acid ester (B) in the block copolymer.)

The monomer sequence distribution can be determined from integrated values of signals derived from the monomer sequence structures and observed in a nuclear magnetic resonance (NMR) spectrum of the block copolymer. For example, the monomer sequence distribution is determined by the method described in Examples below on the basis of the assignment of signals described in Non-patent literature 1.

The content of the methacrylic acid ester (A2) unit in the copolymer block [13/A2] is not particularly limited, but is, in general, preferably 1% to 30% by mass, more preferably 5% to 20% by mass, and still more preferably 10% to 15% by mass. If the content of the methacrylic acid ester (A2) unit is less than 1% by mass, the holding power of the adhesive decreases. If the content of the methacrylic acid ester (A2) unit exceeds 30% by mass, adhesiveness at low temperatures decreases. Furthermore, the content of the acrylic acid ester (B) unit in the copolymer block [B/A2] is not particularly limited, but is, in general, preferably 99% to 70% by mass, more preferably 95% to 80% by mass, and still more preferably 90% to 85% by mass.

In the general formula (I), the total content of the structural units derived from the methacrylic acid ester (A1) and the methacrylic acid ester (A2) is 5% to 60% by mass, and the total content of the structural unit derived from the acrylic acid ester (B) is 95% to 40% by mass. From the viewpoint that a block copolymer having good adhesiveness and an adhesive containing the block copolymer can be provided in an easily handleable form (for example, in the form of pellets or the like), the total content of the structural units derived from the methacrylic acid ester (A1) and the methacrylic acid ester (A2) is preferably 5% to 32% by mass, and the total content of the structural unit derived from the acrylic acid ester (B) is preferably 95% to 68% by mass, and the total content of the structural units derived from the methacrylic acid ester (A1) and the methacrylic acid ester (A2) is more preferably 12% to 18% by mass, and the total content of the structural unit derived from the acrylic acid ester (B) is more preferably 88% to 82% by mass.

The whole of the block copolymer used in the present invention has a weight-average molecular weight (Mw) of 30,000 to 300,000. In particular, from the viewpoint of producing an adhesive, the weight-average molecular weight (Mw) of the whole of the block copolymer is preferably 40,000 to 200,000, more preferably 50,000 to 180,000, still more preferably 60,000 to 150,000, and particularly preferably 90,000 to 130,000. When the adhesive of the present invention is used by being thermally melted through a hot-melt coating method, a T-die method, an inflation method, a calendering method, a lamination method, or the like, the weight-average molecular weight (Mw) is preferably 30,000 to 150,000, and more preferably 35,000 to 120,000 from the viewpoint of productivity in coating or film processing. Furthermore, from the viewpoint of stability of the viscosity behavior in extrusion or the like and coating properties, the weight-average molecular weight (Mw) is particularly preferably 40,000 to 100,000.

The molecular weight distribution (Mw/Mn) represented by a ratio of the weight-average molecular weight (Mw) to the number-average molecular weight (Mn) of the block copolymer used in the present invention is 1.0 to 1.5. From the viewpoint that the holding power of the resulting adhesive at high temperatures is high, the molecular weight distribution is preferably 1.0 to 1.4, and more preferably 1.0 to 1.3.

The weight-average molecular weight (Mw) of the polymer block [A1] is not particularly limited, but is, in general, preferably 1,000 to 50,000, and more preferably 4,000 to 20,000. If the weight-average molecular weight (Mw) of the polymer block [A1] is lower than the lower limit of the above range, the holding power of the resulting adhesive tends to be insufficient. If the weight-average molecular weight (Mw) of the polymer block [A1] is higher than the upper limit of the above range, melt viscosity of the resulting adhesive increases, and hot-melt processability tends to decrease.

The weight-average molecular weight (Mw) of the copolymer block [B/A2] is not particularly limited, but is, in general, preferably 10,000 to 250,000, and more preferably 30,000 to 150,000. If the weight-average molecular weight (Mw) of the copolymer block is lower than the lower limit of the above range, the holding power of the resulting adhesive becomes insufficient and the adhesive strength tends to decrease. If the weight-average molecular weight (Mw) of the copolymer block is higher than the upper limit of the above range, melt viscosity of the resulting adhesive increases, and hot-melt processability tends to decrease.

The polymer block [A1] and the copolymer block [B/A2] may contain structural units derived from other monomers according to need as long as the effect of the present invention is not impaired. Examples of the other monomers include vinyl-based monomers having a carboxyl group, such as (meth)acrylic acid, crotonic acid, maleic acid, maleic anhydride, fumaric acid, and (meth)acrylamide; vinyl-based monomers having a functional group, such as (meth)acrylonitrile, vinyl acetate, vinyl chloride, and vinylidene chloride; aromatic vinyl-based monomers, such as styrene, α-methylstyrene, p-methylstyrene, and m-methylstyrene; conjugated diene-based monomers, such as butadiene and isoprene; olefin-based monomers such as ethylene, propylene, isobutene, and octene; and lactone-based monomers, such as ε-caprolactone and valerolactone. When these other monomers are used, they are usually used in a small amount, and they are preferably used in an amount of 40% by mass or less, more preferably 20% by mass or less, and still more preferably 10% by mass or less relative to the total mass of the monomers used for each polymer block.

The block copolymer used in the present invention preferably forms a microphase separation structure. When the microphase separation structure is formed, a hard phase composed of a component having a high glass transition temperature forms physical pseudo-crosslinking and exhibits a good holding power, and a soft phase composed of a component having a low glass transition temperature exhibits high adhesiveness. The microphase separation structure forms a spherical structure, a cylindrical structure, or a lamellar structure in accordance with, for example, the mass ratio, the volume ratio, and the degree of polymerization of the polymer blocks. In particular, when the hard phase has a spherical structure or a cylindrical structure, a good holding power and good adhesiveness are exhibited.

The polymer block [A1] preferably has a glass transition temperature of 100° C. or higher. When the glass transition temperature of the polymer block [A1] is 100° C. or higher, it is assumed that the polymer block [A1] becomes a hard phase in the formation of the microphase separation structure and functions as physical pseudo-crosslinking points, and a good holding power is exhibited. From the viewpoint of combining hot-melt coating properties and holding power, the glass transition temperature of the polymer block [A1] is more preferably 100° C. to 200° C., and particularly preferably 100° C. to 150° C.

The copolymer block [B/A2] preferably has a glass transition temperature of 10° C. or lower. When the glass transition temperature of the copolymer block [B/A2] is 10° C. or lower, the copolymer block [B/A2] becomes a soft phase in the formation of the microphase separation structure, good flexibility and good wettability are imparted, and adhesiveness is exhibited. From the viewpoint of good tack under low temperature conditions, the glass transition temperature of the copolymer block [B/A2] is more preferably −30° C. or lower, and particularly preferably −40° C. to −80° C.

In the case where, in the copolymer block [B/A2], a polymer section derived from only the methacrylic acid ester (A2) is subsequently connected to the gradient copolymer block section, this polymer section preferably has a glass transition temperature of 100° C. or higher. When the glass transition temperature is 100° C. or higher, it is assumed that the polymer section becomes a hard phase in the formation of the microphase separation structure and functions as physical pseudo-crosslinking points, and a good holding power is exhibited. From the viewpoint of combining hot-melt coating properties and holding power, the glass transition temperature of the polymer section derived from only the methacrylic acid ester (A2) is more preferably 100° C. to 200° C., and particularly preferably 100° C. to 150° C. Note that the glass transition temperature of the polymer section derived from only the methacrylic acid ester (A2) cannot be distinguished from the glass transition temperature of the polymer block [A1] in a usual method for measuring a glass transition temperature.

According to examinations conducted by the inventors of the present invention, it was found that existing acrylic triblock copolymers that do not have a gradient copolymer section (tapered structure) need to contain, for example, a tackifying resin in order to enhance hot-melt processability, and that a holding power of the resulting adhesive may decrease. This time it was found that when the copolymer block [B/A2] in the block copolymer used in the present invention has a gradient copolymer block section in which a copolymerization ratio of the methacrylic acid ester (A2) continuously increases from a section connected to the polymer block [A1], it is possible to produce an adhesive having good processability in hot-melt coating or melt extrusion, high holding power, and good tack and good wettability.

The reason why the adhesive of the present invention has good processability in hot-melt coating or melt extrusion is not known, but is assumed that, due to the presence of the gradient copolymer block section, an order-disorder transition temperature (ODTT) of the block copolymer used in the present invention is lower than that of common block copolymers. In particular, at a temperature equal to or higher than the ODTT, the adhesive of the present invention can be subjected to hot-melt coating at a high speed and smoothly. In contrast, existing hot-melt adhesives containing an acrylic diblock copolymer have a relatively high ODTT. Thus, when such existing hot-melt adhesives are subjected to hot-melt coating at a low temperature and at a high speed, the holding power may be insufficient.

The reason why the adhesive of the present invention has good holding power is believed to be as follows. Specifically, under the use temperature conditions of the resulting adhesive (for example, at room temperature), in the copolymer block [B/A2], a section in the vicinity of the section connected to the polymer block [A1] mainly includes a structural unit derived from the acrylic acid ester (B), and thus the structure clearly changes from the polymer block [A1] to the section that mainly includes the structural unit derived from the acrylic acid ester (B). Accordingly, it is assumed that microphase separation between the polymer block [A1] and the copolymer block [B/A2] relatively clearly occurs. It is believed that, for this reason, the holding power becomes higher.

In contrast, in the case where the copolymer block [B/A2] is a random copolymer composed of an acrylic acid ester (B) and a methacrylic acid ester (A2), the copolymer block [B/A2] has a high glass transition temperature and thus the tack at low temperatures decreases. Furthermore, in the case where the copolymer block [B/A2] is a gradient copolymer block in which a copolymerization ratio of the methacrylic acid ester (A2) continuously decreases from a section connected to the polymer block [A1], in other words, in the case where the copolymer block [B/A2] has a structure that mainly includes a structural unit derived from the methacrylic acid ester (A2) in a section in the vicinity of the section connected to the polymer block [A1] and that mainly includes a structural unit derived from the acrylic acid ester (B) in a section apart from the section connected to the polymer block [A1] (i.e., a structure represented by a general formula -[B/A2]-[A1]- (I')), the copolymer block [B/A2] does not have the structure which clearly changes from the polymer block [A1] to the section that mainly includes a structural unit derived from the acrylic acid ester (B). Therefore, the microphase separation structure becomes unclear, and the holding power tends to relatively decrease.

The tacticity of the polymer block [A1] is not particularly limited. However, the triad syndiotacticity (rr) is preferably 65% or more, and more preferably 70% to 95%. When the syndiotacticity of the polymer block [A1] is 65% or more, good holding power of the adhesive is obtained. The triad isotacticity (mm) is preferably 0% to 3%, and more preferably 0% to 2%. The triad heterotacticity (mr) is preferably 2% to 35%, and more preferably 3% to 30%.

The production process for the block copolymer used in the present invention is not specifically restricted as far as a polymer satisfying the conditions of the present invention regarding the chemical structure is obtained, and processes based on publicly known techniques are adoptable. As a process for obtaining a block copolymer having a narrow molecular weight distribution, a process comprising living-polymerizing monomers that are constitutional units is generally adopted. Examples of such processes comprising living polymerization include a process wherein living polymerization is performed using an organic rare earth metal complex as a polymerization initiator (see Patent literature 4), a process wherein living anionic polymerization is performed using an organic alkaline metal compound as a polymerization initiator in the presence of a mineral acid salt such as a salt of an alkaline metal or an alkaline earth metal (see Patent literature 5), a process wherein living anionic polymerization is performed using an organic alkaline metal compound as a polymerization initiator in the presence of an organoaluminum compound (see Patent literature 6), and an atomic transfer radical polymerization process (ATRP) (see Non patent literature 2).

In the process wherein living anionic polymerization is performed using an organic alkaline metal compound as a polymerization initiator in the presence of an organoaluminum compound among the above production processes, the resulting block copolymer has high transparency, the amount of residual monomers is small, the odor is inhibited, and when the resulting copolymer is used for an adhesive composition, occurrence of bubbles after lamination can be inhibited, so that such a process is preferable. Further, such a process is preferable also from the viewpoints that the molecular structure of the methacrylic acid ester polymer block becomes highly syndiotactic, and this contributes to enhancement of heat resistance of the adhesive composition, and in the case of industrial production, the environmental burden (electrical power necessary for refrigerator for mainly controlling polymerization temperature) is small because living polymerization under relatively mild temperature conditions is possible.

The organoaluminum compound is, for example, an organoaluminum compound represented by the following general formula (IV):

wherein $R^1$, $R^2$ and $R^3$ are each independently an alkyl group which may have a substituent, a cycloalkyl group which may have a substituent, an aryl group which may have a substituent, an aralkyl group which may have a substituent, an alkoxyl group which may have a substituent, an aryloxy group which may have a substituent or an N,N-disubstituted amino group; or $R^1$ is any one group of the above groups, and $R^2$ and $R^3$ together form an arylenedioxy group which may have a substituent.

As the organoaluminum compounds represented by the general formula (IV), isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum, etc. can be preferably mentioned from the viewpoints of high living properties in the polymerization, ease of handling, etc.

Examples of the organic alkaline metal compounds include alkyllithiums and alkyldilithiums, such as n-butyllithium, sec-butyllithium, isobutyllithium, tert-butyllithium, n-pentyllithium and tetramethylenedilithium; aryllithiums and aryldilithiums, such as phenyllithium, p-tolyllithium and lithium naphthalene; aralkyllithiums and aralkyldilithiums, such as benzyllithium, diphenylmethyllithium and dilithium formed by the reaction of diisopropenylbenzene with butyllithium; lithium amides, such as lithium dimethylamide; and lithium alkoxides, such as methoxylithium and ethoxylithium. These may be used singly, or may be used in combination of two or more kinds. From the viewpoint of high polymerization initiation efficiency, alkyllithiums are preferable among them, and of these, tert-butyllithium and sec-butyllithium are more preferable, and sec-butyllithium is still more preferable.

In the living anionic polymerization, an ether compound, such as dimethyl ether, dimethoxy ethane, diethoxy ethane and 12-crown-4; and a nitrogen-containing compound, such as triethylamine, N,N,N',N'-tetramethylethylenediamine, N,N,N',N'',N''-pentamethyldiethylenetriamine, 1,1,4,7,10,10-hexamethyltriethylenetetramine, pyridine and 2,2'-dipyridyl, may be further added in the reaction system. Adding any of these compounds leads to increasing the polymerization rate and the living polymerizability, which can provide block copolymers with a narrower molecular weight distribution and a higher molecular weight.

The living anionic polymerization is usually carried out in the presence of a solvent that is inert to the polymerization reaction. Examples of the solvents include aromatic hydrocarbons, such as benzene, toluene and xylene; halogenated hydrocarbons, such as chloroform, methylene chloride and carbon tetrachloride; and ether compounds, such as tetrahydrofuran and diethyl ether.

For example, the block copolymer used in the present invention can be produced by repeating, a desired number of times, a step of forming a copolymer block [B/A2] at an end of a desired living polymer (polymer block [A1]), which is obtained by polymerizing a methacrylic acid ester (A1), and forming another desired polymer block; and then terminating the polymerization reaction. Before the polymer block [A1] is formed, a step of forming a desired polymer block may be performed. Specifically, the block copolymer can be produced by, for example, performing a plurality of polymerization steps including a first step of polymerizing a monomer that forms a first polymer block [A1], a second step of polymerizing monomers that form a second polymer block [B/A2], and if necessary, a third step of polymerizing a monomer that forms a third polymer block, each of the steps being performed using a polymerization initiator composed of an organic alkali metal compound in the presence of an organoaluminum compound, and then allowing an active end of the resulting polymer to react with an alcohol or the like to terminate the polymerization reaction.

The block copolymer used in the present invention has a gradient copolymer block section in the [B/A2] copolymer block section. In general, a copolymer block having a gradient copolymer block section can be formed by mixing two or more monomers having different copolymerization reactivity ratios and copolymerizing the monomers in the above living polymerization method. For example, when two monomers (X and Y) having different copolymerization reactivity ratios are mixed and added to the reaction system for living polymerization ends, first, polymerization of a monomer having a large copolymerization reactivity ratio (hereinafter, X) preferentially proceeds. With a gradual decrease in the concentration of X in the system, the concentration of a monomer having a small copolymerization reactivity ratio (hereinafter, Y) relative to X increases, and polymerization of Y proceeds. As a result, it is possible to form a copolymer block having a gradient copolymer block section in which a copolymerization ratio of X to Y continuously changes along the molecular chain. For example, Patent literature 7 discloses that a gradient copolymer is obtained by copolymerizing styrene and butadiene having different copolymerization reactivity ratios.

According to the method described above, polymerization of the [B/A2] copolymer block in the block copolymer used in the present invention can be performed by mixing and copolymerizing an acrylic acid ester (B) and a methacrylic acid ester (A2) having different copolymerization reactivity ratios. For example, a reactivity ratio of the acrylic acid ester (B) in anionic polymerization is larger than that of the methacrylic acid ester (A) (refer to Patent literature 6). Accordingly, in the case where these monomers are mixed and copolymerized, polymerization of the acrylic acid ester (B) preferentially proceeds, the concentration of the methacrylic acid ester (A) relative to the acrylic acid ester (B) then increases, and polymerization of the methacrylic acid ester (A) proceeds.

In the method of conducting living polymerization described above, a copolymer block having a gradient copolymer block section can also be formed by a method in which a mixture of the monomer X and the monomer Y is added a plurality of times in a divided manner. Regarding the addition method in such a case, the monomer mixture may be added at a timing at which the monomer X having a large copolymerization reactivity ratio is consumed and the monomer Y having a small copolymerization reactivity ratio still remains. In this case, the concentration of Y relative to X increases with each addition, and thus a gradient copolymer block having a higher molecular weight can be formed. In the case where a monomer mixture is added a plurality of times in a divided manner, the number of additions is not strictly limited, but is usually 3 or more. From the viewpoint that a copolymer block having a continuous gradient copolymer block section can be easily formed, the number of additions is preferably 5 or more, and more preferably 10 or more. In the case where a monomer mixture is added a plurality of times in a divided manner, from the viewpoint that a copolymer block having a continuous gradient copolymer block section can be easily formed, the amount of the monomer mixture added each time is preferably the same amount each time or preferably produces a gradient so that the amount decreases with each addition.

In the polymerization of the methacrylic acid ester (A), the polymerization temperature is preferably 0° C. to 100° C. In the polymerization of the acrylic acid ester (B) or a monomer mixture of the acrylic acid ester (B) and the methacrylic acid ester (A), the polymerization temperature is preferably −50° C. to 50° C. If the polymerization temperature is lower than the lower limit of the above range, progress of the reaction becomes slow, and a long time is required for the completion of the reaction. On the other hand, if the polymerization temperature is higher than the upper limit of the above range, deactivation of living polymer ends increases, and as a result, the molecular weight distribution may be widened or a desired block copolymer may not be obtained.

The content of the block copolymer contained in the adhesive of the present invention is preferably 10% by mass or more, more preferably 40% by mass or more, still more preferably 60% by mass or more, particularly preferably 72% by mass or more, and most preferably 100% by mass in the adhesive of the present invention from the viewpoint of the holding power and heat resistance.

In the adhesive of the present invention, other polymers and additives, such as tackifying resin, softener, plasticizer, heat stabilizer, light stabilizer, antistatic agent, flame retardant, blowing agent, colorant, dye, refractive index adjusting agent, filler and curing agent, may be contained. These other polymers and additives may be contained singly, or may be contained in combination of two or more kinds.

Examples of said other polymers include acrylic resins, such as poly(methyl methacrylate), and (meth)acrylic acid ester copolymers other than the block copolymers used in the present invention; olefin-based resins, such as polyethylene, ethylene/vinyl acetate copolymer, polypropylene, polybutene-1, poly-4-methylpentene-1 and polynorbornene; ethylene-based ionomers; styrene-based resins, such as polystyrene, styrene/maleic anhydride copolymer, high impact polystyrene, AS resin, ABS resin, AES resin, AAS resin, ACS resin and MBS resin; styrene/methyl methacrylate copolymer; polyester resins, such as polyethylene terephthalate, polybutylene terephthalate and polylactic acid; polyamides, such as nylon 6, nylon 66 and polyamide elastomer; polycarbonate; polyvinyl chloride; polyvinylidene chloride; polyvinyl alcohol; ethylene/vinyl alcohol copolymer; polyacetal; polvinylidene fluoride; polyurethane; modified polyphenylene ether; polyphenylene sulfide; silicone rubber modified resins; acrylic rubbers; silicone-based rubbers; styrene-based thermoplastic elastomers, such as SEPS, SEBS and SIS; and olefin-based rubbers, such as IR, EPR and EPDM. Of these, acrylic resins, ethylene/vinyl acetate copolymer, AS resin, polylactic acid and polyvinylidene fluoride are preferable, and (meth)acrylic acid ester copolymers other than the block copolymers used in the present invention are more preferable, from the viewpoint of compatibility with the acrylic block copolymer constituting the adhesive of the present invention.

As the (meth)acrylic acid ester copolymers other than the block copolymer used in the present invention, diblock copolymers that do not have a gradient structure and triblock copolymers that do not have a gradient structure, each of which contains at least one polymer block including methacrylic acid ester units and at least one polymer block including acrylic acid ester units, are preferable.

Examples of the tackifying resins, which may be contained in the adhesive of the present invention, include natural resins, such as rosin-based resins and terpene-based resins; and synthetic resins, such as petroleum resins, hydrogen-added (sometimes referred to as "hydrogenated" hereinafter) petroleum resins, styrene-based resins, coumarone-indene-based resins, phenolic resins and xylene resins. When the tackifying resin is incorporated, the content thereof is preferably 1 to 200 parts by mass, more preferably 1 to 100 parts by mass, still more preferably 3 to 70 parts by mass, far more preferably 5 to 50 parts by mass, particularly preferably 5 to 40 parts by mass, most preferably 5 to 35 parts by mass, based on 100 parts by mass of the block copolymer used in the present invention, from the viewpoints of strength and durability.

Examples of the rosin-based resins include rosins, such as gum rosin, tall oil rosin and wood rosin; modified rosins, such as hydrogenated rosin, disproportionated rosin and polymerized rosin; and rosin esters, such as glycerol esters and pentaerythritol esters of these rosins and modified rosins. Specific examples of the rosins include Pinecrystal KE-100, Pinecrystal KE-311, Pinecrystal KE-359, Pinecrystal KE-604, Pinecrystal D-6250, PENSEL D125 and PENSEL D165 (each manufactured by Arakawa Chemical Industries, Ltd.) as well as Foral 85 and Foral 105 (manufactured by Pinova, Inc.).

Examples of the terpene-based resins include terpene resins having α-pinene, β-piene, dipentene or the like as a main body, aromatic modified terpene resins, hydrogenated terpene resins and terpene phenol resins. Specific examples of the terpene-based resins include Tamanol 901 (manufactured by Arakawa Chemical Industries, Ltd.); as well as YS Polyster T100, YS Polyster T115 and YS Polyster T130 (manufactured by Yasuhara Chemical Co., Ltd.).

Examples of the (hydrogenated) petroleum resins include (hydrogenated) aliphatic ($C_5$ type) petroleum resins, (hydrogenated) aromatic ($C_9$ type) petroleum resins, (hydrogenated) copolymer-based ($C_5/C_9$ type) petroleum resins, (hydrogenated) dicyclopentadiene-based petroleum resins and alicyclic saturated hydrocarbon resins. Specific examples thereof include ARKON M90 and ARKON M100 (manufactured by Arakawa Chemical Industries, Ltd.).

Examples of the styrene-based resins include poly-α-methylstyrene, α-methylstyrene/styrene copolymer, styrene/aliphatic monomer copolymer, styrene/α-methylstyrene/aliphatic monomer copolymer, styrene-based monomer copolymer, and styrene/aromatic monomer copolymer. Specific examples of the styrene-based resins include FTR6000 series and FTR7000 series (manufactured by Mitsui Chemicals, Inc.).

Of the above tackifying resins, rosin-based resins, terpene-based resins, (hydrogenated) petroleum resins and styrene-based resins are preferable. From the viewpoints of resistance to photo-deterioration and inhibition of coloration and occurrence of bubbles caused by impurities, disproportionated or hydrogenated rosins having been purified by operations such as distillation, recrystallization and extraction are more preferable. These may be used singly, or may be used in combination of two or more kinds. The softening point of the tackifying resin is preferably 50 to 150° C. from the viewpoint of appearance of high adhesive strength.

Examples of the plasticizers include fatty acid esters, e.g., phthalic acid esters, such as dibutyl phthalate, di-n-octyl phthalate, bis-2-ethylhexyl phthalate, di-n-decyl phthalate and diisodecyl phthalate, sebacic acid esters, such as bis-2-ethylhexyl sebacate and di-n-butyl sebacate, azelaic acid esters, such as bis-2-ethylhexyl azelate, and adipic acid esters, such as bis-2-ethylhexyl adipate and di-n-octyl adipate; paraffins, such as chlorinated paraffin; glycols, such as polyethylene glycol and polypropylene glycol; epoxy-based high-molecular plasticizers, such as epoxidized soybean oil and epoxidized linseed oil; phosphoric acid esters, such as trioctyl phosphate and triphenyl phosphate; phosphorous acid esters, such as triphenyl phosphite; acrylic oligomers, such as poly(n-butyl (meth)acrylate) and poly(2-ethylhexyl (meth)acrylate); polybutene; polyisobutylene; polyisoprene; process oil; and naphthenic oil. These may be used singly, or may be used in combination of two or more kinds. When the plasticizer is incorporated, the content thereof is preferably 1 to 1000 parts by mass, more preferably 2 to 500 parts by mass, still more preferably 3 to 180 parts by mass, far more preferably 3 to 80 parts by mass, particularly preferably 4 to 40 parts by mass, most preferably 5 to 15 parts by mass, based on 100 parts by mass of the block copolymer used in the present invention, from the viewpoints of melt processability, adhesive strength and durability.

Examples of the fillers include inorganic fibers and organic fibers, such as glass fiber and carbon fiber; and inorganic fillers, such as calcium carbonate, talc, carbon black, titanium oxide, silica, clay, barium sulfate and magnesium carbonate. When the inorganic fibers or the organic fibers are contained, durability is imparted to the resulting adhesive. When the inorganic fillers are contained, heat resistance and weathering resistance are imparted to the resulting adhesive.

When the adhesive of the present invention further contains a curing agent, the adhesive can be preferably used as a curing type hot-melt adhesive, which in its use is hot-melt applied and then crosslinked. As the curing agent, photo-curing agents such as UV curing agents, and thermal curing agents can be mentioned, and for example, benzoins, benzoin ethers, benzophenones, anthraquinones, benzyls, acetophenones and diacetyls can be mentioned. Specific examples thereof include benzoin, α-methylolbenzoin, α-t-butylbenzoin, benzoin methyl ether, benzoin ethyl ether, benzoin n-propyl ether, benzoin isopropyl ether, benzoin isobutyl ether, α-methylolbenzoin methyl ether, α-methoxybenzoin methyl ether, benzoin phenyl ether, benzophenone, 9,10-anthraquinone, 2-ethyl-9,10-anthraquinone, benzyl, 2,2-dimethoxy-1,2-diphenylethan-1-one (2,2-dimethoxy-2-phenylacetophenone) and diacetyl. The curing agents may be used singly, or may be used in combination of two or more kinds.

From the viewpoint of increase in effects of the curing agent, there may be further added, for example, monomers, specifically, α,β-unsaturated carboxylic acids, such as acrylic acid, methacrylic acid, α-cyanoacrylic acid, α-halogenated acrylic acid, crotonic acid, cinnamic acid, sorbic acid, maleic acid and itaconic acid; α,β-unsaturated carboxylic acid esters, such as acrylic acid ester, methacrylic acid ester, crotonic acid ester and maleic acid ester; acrylamide; methacrylamide; acrylamide derivatives, such as N-methylolacrylamide, N-hydroxyethylacrylamide and N,N-(dihydroxyethyl)acrylamide; methacrylamide derivatives, such as N-methylolmethacrylamide, N-hydroxyethylmethacrylamide and N,N-(dihydroxyethyl)methacrylamide; vinyl esters; vinyl ethers; mono-N-vinyl derivatives; and styrene derivatives; and oligomers containing any of the above monomers as constituents. From the viewpoint of increase in durability, preferable are α,β-unsaturated carboxylic acid esters, such as acrylic acid ester, methacrylic acid ester, crotonic acid ester and maleic acid ester; vinyl ethers; styrene derivatives; and oligomers containing any of the above monomers as constituents. In addition to these monomers or oligomers, crosslinking agents comprising bifunctional or higher functional monomers or oligomers may be further added.

The production process for the adhesive of the present invention is not specifically restricted, and the adhesive can be produced by, for example, mixing the components using a known mixing or kneading device, such as a kneader-ruder, an extruder, a mixing roll or a Banbury mixer, usually at a temperature of 100° C. to 250° C. The adhesive may be produced by dissolving each component in an organic solvent, mixing the solutions and then removing the organic solvent. The resulting adhesive can be used by being thermally melted, or it may be used as a solution-type adhesive by dissolving it in a solvent. Examples of the solvents include toluene, ethyl acetate, ethylbenzene, methylene chloride, chloroform, tetrahydrofuran, methyl ethyl ketone, dimethyl sulfoxide and a toluene-ethanol mixed solvent. Of these, toluene, ethylbenzene, ethyl acetate and methyl ethyl ketone are preferable.

When the adhesive of the present invention is used by being thermally melted, the melt viscosity is preferably low from the viewpoints of processability and handleability, and for example, when the adhesive is subjected to holt-melt processing, the melt viscosity at 200° C. is preferably not more than 50,000 mPa·s, more preferably not more than 30,000 mPa·s. When the adhesive is subjected to holt-melt processing at a lower temperature at high speed, the melt viscosity at 180° C. is preferably not more than 30,000 mPa·s, more preferably not more than 10,000 mPa·s.

The adhesive of the present invention is favorably used for an adhesive layer composed of the adhesive or an adhesive product in the form of a laminate containing the adhesive layer.

When the adhesive layer is formed by thermal melting of the adhesive of the present invention, the adhesive can be processed into a sheet, a film or the like using, for example, a hot-melt coating method, a T-die method, an inflation method, a calendering method, a lamination method or the like. When the adhesive of the present invention is used by dissolving it in a solvent, the adhesive layer can be formed by a method in which a heat-resistant material such as polyethylene terephthalate, or a flat plate or a roll of a steel belt, is used as a substrate, and a solution obtained by dissolving the adhesive of the present invention in a solvent is applied onto the substrate using a bar coater, a roll coater, a die coater, a comma coater or the like and then dried to remove the solvent.

The method to remove the solvent by drying is not specifically restricted, and a hitherto publicly known method can be used, but it is preferable to carry out drying in plural stages. When drying is carried out in plural stages, it is more preferable that the drying in the first stage is carried out at a relatively low temperature in order to inhibit expansion due to rapid evaporation of the solvent, and the drying in the second stage and thereafter is carried out at a high temperature in order to sufficiently remove the solvent.

The concentration of the adhesive in the solution is appropriately determined in consideration of solubility of the adhesive in solvents, the viscosity of the resulting solution, etc. A preferable lower limit of the concentration of the adhesive is 5% by mass, and a preferable upper limit of the concentration of the adhesive is 80% by mass. In the case where the adhesive of the present invention is used as a solution-type adhesive, since a solution viscosity of the adhesive is lower than that of existing solution-type adhesives, coating can be performed at a high adhesive concentration of 60% by mass or more and thus the amount of organic solvent used can be reduced.

The laminate is obtained by laminating an adhesive layer composed of the adhesive of the present invention onto any of various bases, such as paper, cellophane, plastic materials, cloth, wood and metals. When the base layer is composed of a transparent material, a transparent laminate is obtained because the adhesive of the present invention is excellent in transparency and weathering resistance, so that such a base layer is preferable. Examples of the base layer composed of transparent materials are base layers composed of a polymer, such as polyethylene terephthalate, triacetyl cellulose, polyvinyl alcohol, cycloolefin-based resin, styrene/methyl methacrylate copolymer, polypropylene, polyethylene, polyvinyl chloride, ethylene/vinyl acetate copolymer, polycarbonate, poly(methyl methacrylate), polyethylene or polypropylene, mixtures of two or more of these polymers, and glasses, without limiting thereto.

Examples of structures of the laminate include a 2-layer structure of an adhesive layer composed of the adhesive of the present invention and a base layer, a 3-layer structure of two base layers and an adhesive layer composed of the adhesive of the present invention (base layer/adhesive layer/base layer), a 4-layer structure of two base layers and two different adhesive layers (a) and (b) composed of the adhesive of the present invention (base layer/adhesive layer (a)/adhesive layer (b)/base layer), a 4-layer structure of two base layers, an adhesive layer (a) composed of the adhesive of the present invention and an adhesive layer (c) composed of another material (base layer/adhesive layer (a)/adhesive layer (c)/base layer), and a 5-layer structure of three base layers and two adhesive layers composed of the adhesive of the present invention (base layer/adhesive layer/base layer/adhesive layer/base layer), without limiting thereto.

Although the thickness ratio in the laminate is not specifically restricted, the thickness ratio (base layer/adhesive layer) is preferably in the range of 1/1000 to 1000/1, more preferably 1/200 to 200/1, from the viewpoints of adhesion properties, durability and handleability of the resulting adhesive products.

In producing the laminate, an adhesive layer and a base layer separately formed may be laminated together by a lamination method or the like, or an adhesive layer may be directly formed on a base layer, or an adhesive layer and a base layer may be co-extruded to form a layer structure at a time.

In order to increase adhesive force between the base layer and the adhesive layer in the laminate of the present invention, the surface of the base layer may be subjected to surface treatment such as corona discharge treatment or plasma discharge treatment in advance. Further, on the surface of at least one of the adhesive layer and the base layer, an anchor layer may be formed using a resin having bonding properties, or the like.

Examples of the resins used for the anchor layer include an ethylene/vinyl acetate copolymer, an ionomer, a block copolymer (e.g., styrene-based triblock copolymer such as SIS or SBS, and diblock copolymer), an ethylene/acrylic acid copolymer and an ethylene/methacrylic acid copolymer. One anchor layer may be formed, or two or more anchor layers may be formed.

When the anchor layer is formed, the method to form the anchor layer is not specifically restricted, and examples of the method include a method wherein a solution containing the resin is applied onto the base layer to form the anchor layer and a method wherein a composition containing the resin or the like that becomes the anchor layer is thermally melted, and using the melt, the anchor layer is formed on the base layer surface by means of a T-die or the like.

When the anchor layer is formed, the resin that becomes the anchor layer and the adhesive of the present invention may be co-extruded to integrally laminate the anchor layer and the adhesive layer on the base layer surface, or the resin that becomes the anchor layer and the adhesive may be laminated in order on the base layer surface, and when the base layer is a plastic material layer, the plastic material that becomes the base layer, the resin that becomes the anchor layer and the adhesive may be co-extruded at a time.

The adhesive of the present invention can be used for various purposes. The adhesive layer composed of the adhesive can be used alone as an adhesive sheet, and also the laminate containing the adhesive layer can be applied for various purposes. For example, there can be mentioned adhesives and adhesive tapes or films for surface protection, masking, binding, packaging, office uses, labels, decoration/display, joining, dicing tapes, sealing, corrosion prevention/waterproofing, medical/sanitary uses, prevention of glass scattering, electrical insulation, holding and fixing of electronic equipments, production of semiconductors, optical display films, adhesion type optical films, shielding from electromagnetic waves, and sealing materials of electric and electronic parts. Specific examples are given below.

The adhesives, the adhesive tapes or films, etc. for surface protection can be used for various materials, such as metals, plastics, rubbers and wood, and specifically, they can be used for surface protection of coating material surfaces, metals during deformation processing or deep drawing, and automobile parts or optical parts. Examples of the automobile parts include coated exterior plates, wheels, mirrors, windows, lights and light covers. Examples of the optical parts include various image display devices, such as liquid crystal display, organic EL display, plasma display and field emission display; optical disk constitutional films, such as polarizing film, polarizing plate, retardation plate, light guiding panel, diffusion plate and DVD; and fine coat faceplates for electronic/optical uses.

Examples of uses of the adhesives, the tapes, the films, etc. for masking include masking in manufacturing of printed wiring boards or flexible printed wiring boards; masking in a plating or soldering treatment for electronic equipments; and masking in manufacturing of vehicles such as automobiles, coating of vehicles and buildings, textile printing, and parting of civil engineering works.

Examples of uses for binding include binding of wire harnesses, electric wires, cables, fibers, pipes, coils, windings, steel materials, ducts, plastic bags, foods, vegetables and flowering plants.

Examples of uses for packaging include heavy material packaging, packaging for export, sealing of corrugated fiberboards and can sealing.

Examples of office uses include general use for office, and uses for sealing, mending of books, drawing and memorizing.

Examples of uses for labels include price display, merchandise display, tags, POP, stickers, stripes, nameplates, decoration and advertisement.

Examples of the labels include labels having, as bases, papers, such as paper, converted paper (paper having been subjected to aluminum deposition, aluminum laminating, varnishing, resin treatment or the like) and synthetic paper; and films made of cellophane, plastic materials, cloth, wood and metals. Specific examples of the bases include woodfree paper, art paper, cast-coated paper, thermal paper, foil paper; polyethylene terephthalate film, polyvinyl chloride film, OPP film, polylactic acid film, synthetic paper, thermal synthetic paper and overlaminate film. From the viewpoints of excellent transparency and weathering resistance, the adhesive of the present invention can be favorably used for labels using bases made of transparent materials among them. Further, because of little discoloration with time, the adhesive of the present invention can be favorably used for thermal labels having thermal paper or thermal synthetic paper as a base.

Examples of adherends for the labels include plastic products, such as plastic bottles and foamed plastic cases; paper or corrugated fiberboard products, such as corrugated fiberboard boxes; glass products, such as glass bottles; metal products; and other inorganic material products, such as ceramic products.

The label comprising a laminate containing an adhesive layer composed of the adhesive of the present invention can be peeled without adhesive transfer after it is used. Moreover, it can be allowed to adhere to an adherend even at low temperatures (−40 to +10° C.), and even if it is stored at low temperatures (−40 to +10° C.), it does not come off. Thus, the laminate can be favorably used for labels for refrigerated food, frozen food and the like.

Examples of uses for decoration/display include danger display seals, line tapes, wiring markings, after-glow luminous adhesive tapes and reflecting sheets.

Examples of the adhesion type optical films include optical films on at least a part or all of one or both surfaces of which, an adhesive layer has been formed, such as polarizing films, polarizing plates, retardation films, viewing angle enlarging films, luminance improving films, anti-reflection films, antiglare films, color filters, light guiding panels, diffusion films, prism sheets, electromagnetic wave shielding films, near infrared absorbing films, functional composite optical films, films for ITO lamination, impact resistance imparting films, and visibility improving films. In the adhesion type optical films, films in which an adhesive layer composed of the adhesive of the present invention has been formed on a protective film used for protecting a surface of the above optical film are included. The adhesion type optical films are favorably used in various image display devices, such as liquid crystal display devices, PDP, organic EL display devices, electronic paper, game machines and mobile terminals.

Examples of uses for electrical insulation include protective covering or insulation of coils, and layer insulation such as motor/transformer layer insulation.

Examples of uses for holding and fixing of electrical equipments include carrier tapes, packaging, fixing of cathode ray tubes, splicing and rib reinforcement.

Examples of uses for production of semiconductors include protection of silicon wafers.

Examples of uses for joining include adhesive/bonding in various adhesive/bonding fields, automobiles, electric trains and electric equipments, fixing of printing plates, construction, fixing of nameplates, adhesive/bonding in general homes, and adhesive/bonding to rough surfaces, irregular surfaces and curved surfaces.

Examples of uses for sealing include sealing for heat insulation, vibration isolation, waterproofing, moisture proofing, sound insulation and dust proofing.

Examples of uses for corrosion prevention/waterproofing include corrosion prevention for gas pipes and water pipes, corrosion prevention for large diameter pipes, and corrosion prevention for civil engineering buildings.

Examples of medical and sanitary uses include uses for percutaneous absorbent drugs, such as analgesic anti-inflammatory agents (plasters, poultices), ischemic heart disease remedies, female hormone replacement drugs, bronchodilators, cancer pain palliatives, stop smoking aids, plasters for cold, antipruritic patches and keratin softening agents; uses for various tapes, such as first-aid plasters (containing germicide), surgical dressings/surgical tapes, plasters, hemostatic tapes, tapes for human waste disposal devices (artificial anus fixing tapes), tapes for stitching, antibacterial tapes, fixing tapings, self-adhesive bandages, adhesive tapes for oral mucosa, tapes for sporting, and depilatory tapes; uses for beauty, such as facial packs, moistening sheets for skin round the eye and keratin peel packs; cooling sheets, pocket body warmers, and uses for dust proofing, waterproofing and noxious insect capture.

Examples of uses for sealing materials of electronic/electric parts include liquid crystal monitors and solar cells.

EXAMPLES

The present invention will be more specifically described on the basis of Examples etc. However, it is to be understood that the present invention is not limited to the Examples below.

Various properties of Examples and Comparative Examples were measured or evaluated by the methods described below.
(1) Measurement of Number-Average Molecular Weight (Mn), Weight-Average Molecular Weight (Mw), and Molecular Weight Distribution (Mw/Mn)

Molecular weights were each determined as a molecular weight in terms of standard polystyrene by gel permeation chromatography (hereinafter abbreviated as "GPC").

Apparatus: GPC apparatus "HLC-8020" manufactured by Tosoh Corporation

Separation column: "TSKgel GMHXL", "G4000HXL", and "G5000HXL" manufactured by Tosoh Corporation were connected in series.

Eluent: tetrahydrofuran

Flow rate of eluent: 1.0 mL/min

Column temperature: 40° C.

Detection method: differential refractive index (RI)

Calibration curve: prepared by using standard polystyrenes (2) Measurement of Content of Each Copolymerization Component in Copolymer The content was determined by $^1$H-NMR measurement.

Apparatus: nuclear magnetic resonance apparatus (JNM-ECX400) manufactured by JEOL Ltd.

Solvent: deuterated chloroform

Signals in the vicinity of 3.6 ppm and 3.8 to 4.1 ppm in a $^1$H-NMR spectrum were assigned to an ester group (—O—C$\underline{H}_3$) of a methyl methacrylate unit and an ester group (—O—C$\underline{H}_2$—CH$_2$—CH$_2$—CH$_3$ or —O—C$\underline{H}_2$—CH(—CH$_2$—CH$_3$)—CH$_2$—CH$_2$—CH$_2$—CH$_3$) of an acrylic acid ester unit, respectively, and the content of each copolymerization component was determined by a ratio of their integrated values.

(3) Analysis of Triad Monomer Sequence in Block Copolymer and Presence or Absence of Copolymer Structure of Methacrylic Acid Ester (A) and Acrylic Acid Ester (B)

The structure was determined by $^{13}$C-NMR measurement. The assignment of signals was performed in accordance with Non-patent literature 1.

Apparatus: nuclear magnetic resonance apparatus (JNM-ECX400) manufactured by JEOL Ltd.

Solvent: deuterated chloroform

In the case where the methacrylic acid ester (A) is methyl methacrylate and the acrylic acid ester (B) is n-butyl acrylate or 2-ethylhexyl acrylate, a ratio of a monomer sequence distribution represented by a general formula (III) below:

AAB/(AAB+BAB)　　(III)

(where, in the formula, AAB represents a ratio of the triad monomer sequence of methacrylic acid ester (A)-methacrylic acid ester (A)-acrylic acid ester (B) in the block copolymer, and BAB represents a ratio of the triad monomer sequence of acrylic acid ester (B)-methacrylic acid ester (A)-acrylic acid ester (B) in the block copolymer) was determined by a ratio of an integrated value of a signal in the vicinity of 18.0 ppm in a $^{13}$C-NMR spectrum of a block copolymer, the signal being assigned to the carbon of an α-methyl group of the methacrylic acid ester (A) of a triad monomer sequence of AAB, to an integrated value of a signal in the vicinity of 20.0 ppm in the $^{13}$C-NMR spectrum, the signal being assigned to the carbon of an α-methyl group of the methacrylic acid ester (A) of a triad monomer sequence of BAB. Table 1 shows the assignment of the carbon of an α-methyl group of a triad monomer sequence in a $^{13}$C-NMR spectrum of a copolymer of methyl methacrylate and n-butyl acrylate. Note that, in the case where signals are clearly confirmed in the vicinity of 18.0 ppm and 20.0 ppm, copolymer structures of the methacrylic acid ester (A) and the acrylic acid ester (B) are present.

TABLE 1

| Signal | Assignment | Triad monomer sequence |
| --- | --- | --- |
| 16.3 ppm | Carbon of α-methyl group of | AAA |
| 18.0 ppm | methacrylic acid ester (A) | AAB |
| 20.0 ppm | | BAB |

Assignment of triad monomer sequences in $^{13}$C-NMR spectrum of copolymer of methyl methacrylate (A) and n-butyl acrylate (B)

(4) Analysis of Triad Syndiotacticity (rr) of Polymer Block [A1]:

The triad syndiotacticity (rr) was analyzed by a $^1$H-NMR method.

Specifically, in a $^1$H-NMR spectrum, signals in the vicinity of 0.85 ppm, 1.02 ppm, and 1.22 ppm are assigned to the α-C$\underline{H}_3$ of a methyl methacrylate polymer, and correspond to triad syndiotactic, heterotactic, and isotactic structures, respectively. The triad syndiotacticity (rr) was determined from a ratio of integrated values of the signals. The triad syndiotacticity can also be analyzed by a $^{13}$C-NMR method. In such a case, in a $^{13}$C-NMR spectrum, signals in the vicinity of 44.5 ppm, 44.8 ppm, and 45.5 ppm are assigned to the quaternary carbon atom of a methyl methacrylate polymer block, and correspond to triad syndiotactic, heterotactic, and isotactic structures, respectively. The triad syndiotacticity (rr) was determined from a ratio of integrated values of the signals. The following apparatus was used.

Apparatus: nuclear magnetic resonance apparatus (JNM-ECX400) manufactured by JEOL Ltd.

Solvent: deuterated chloroform (5) Measurement of Conversion Ratio (Polymerization Conversion Ratio) of Charged Monomers of Methyl Methacrylate, n-Butyl Acrylate, and 2-Ethylhexyl Acrylate A measurement was conducted under the conditions described below using gas chromatography (hereinafter abbreviated as "GC"), and a polymerization conversion ratio was determined.

Instrument: Gas chromatograph GC-14A manufactured by Shimadzu Corporation

Column: "INERT CAP 1" manufactured by GL Sciences Inc. (df=0.4 μm, 0.25 mm I.D.×60 m)

Analysis conditions: injection 150° C., detector 250° C., 70° C. (holding for 5 minutes)→temperature increase at 10° C./min→250° C. (holding for 2 minutes)

(6) 180° Peel Strength (Stainless and Polyethylene)

A 180° peel strength was measured in accordance with JIS Z0237. Specifically, adhesive tapes having a thickness of 25 μm and prepared in Examples 1 to 8 and Comparative Examples 1 to 8 were each cut into a width of 25 mm and a length of 100 mm. The tape was allowed to adhere to a stainless steel (SUS304) plate (bright annealing treatment (hereinafter referred to as "BA treatment") product). After the resulting sample was stored at room temperature for 24 hours, the tape was peeled at 23° C. and a rate of 300 mm/min in the direction of 180° to measure a peel strength. In addition, for the sample after the peeling, the presence or absence of residual adhesive was determined by visual observation.

Furthermore, adhesive tapes having a thickness of 25 and prepared in Examples 1 to 4 and 8 and Comparative Example 5 were each cut into a width of 25 mm and a length of 100 mm. The tape was allowed to adhere to a polyethylene (PE) plate (opaque white, manufactured by AS ONE Corporation). After the resulting sample was stored at room temperature for 24 hours, the tape was peeled at 23° C. and a rate of 300 mm/min in the direction of 180° to measure a peel strength.

(7) Holding Power

A holding power was measured in accordance with JIS Z0237. Specifically, a prepared adhesive tape having a thickness of 25 μm (width 25 mm×length 25 mm) was allowed to adhere to a stainless steel (SUS304) plate (BA treatment product), and a load of 1 kg was then hung from the adhesive tape at a temperature of 90° C. A falling time or, in the case where the adhesive tape did not fall, a displacement distance after 1,000 minutes was determined.

(8) SAFT (Heat Resistance)

A shear adhesion failure temperature (SAFT) was measured in accordance with ASTM D4498. Specifically, a prepared adhesive tape having a thickness of 25 μm (width 25 mm×length 25 mm) was allowed to adhere to a stainless steel (SUS304) plate (BA treatment product), a load of 500 g was then hung from the adhesive tape, and the temperature was increased from 40° C. to 205° C. at a rate of 0.5° C./min. A temperature at which the adhesive tape fell was determined.

(9) Ball Tack

A ball tack was measured in accordance with JIS 20237. Specifically, on an adhesive tape having a thickness of 25 μm, which had been placed so as to have an inclination angle of 30°, balls conforming to the ball tack method were rolled to determine the number of the largest ball which stopped on the adhesive tape.

(10) Complex Viscosity and Temperature at which tan δ Becomes 1

Toluene solutions having a concentration of 30% by mass were prepared so as to have the compositions shown in Table 3. Each of the solutions was subjected to solution casting to obtain an adhesive sheet having a thickness of 1 mm. Dynamic viscoelasticity in torsional vibration was measured using the adhesive sheet under the following conditions to determine a complex viscosity at each temperature (160° C., 180° C., and 200° C.) and a temperature at which tan δ (loss shear modulus/storage shear modulus) became 1 under a temperature condition of 50° C. or higher.

Apparatus: "Advanced Rheometric Expansion System" manufactured by Rheometric Scientific Ltd.
Parallel plate: diameter 8 mm
Vibration mode: torsional vibration
Number of vibrations: 6.28 rad/sec
Measuring temperature range: −50° C. to 250° C.
Temperature-increasing rate: 3° C./min
Strain: 0.05% (−50° C. to −37° C.), 1.0% (−37° C. to −15° C.), 5.0% (−15° C. to 250° C.)

(11) Hot-melt Coating Properties

Each of the adhesives prepared by melt-kneading in a mass ratio shown in Table 3 was applied onto a polyester film with a thickness of 100 μm using a coater at a temperature of 180° C. so as to have a thickness of 40 μm, thus preparing a sheet. The resulting sheet was visually observed, and the degree of roughness of the coated surface was evaluated on the basis of three criteria: "excellent (coated surface is mirror-like)" (A), "good (coated surface has some humps or uneven coating is somewhat observed)" (B), and "not good (coated surface has a large number of humps or uneven coating is clearly observed)" (C).

The magnitude of copolymerization reactivity ratio of methyl methacrylate and n-butyl acrylate used in Examples was evaluated by the methods described below.

<Polymerization Conversion Ratio of Methyl Methacrylate>

(1) The interior of a 500-mL Schlenk flask equipped with a three-way stopcock was purged with nitrogen. Subsequently, 199 g of toluene, 0.148 g of 1,1,4,7,10,10-hexamethyltriethylenetetramine (hereinafter referred to as "HMTETA"), and 2.68 g of a toluene solution containing 1.35 mmol of isobutylbis(2,6-di-t-butyl-4-methylphenoxy) aluminum (hereinafter referred to as "IBT") were added to the flask at room temperature. Furthermore, 0.344 g of a mixed solution of cyclohexane and n-hexane containing 0.586 mmol of sec-butyllithium (hereinafter referred to as "s-BuLi") was added thereto.

(2) To each of five 100-mL three-necked flasks, the interior of which was purged with nitrogen, 25.4 g of the solution prepared in (1) was added at room temperature. Subsequently, the resulting polymerization solution was cooled, and 0.529 g of methyl methacrylate (hereinafter referred to as "MMA") was added to each of the flasks at an internal temperature of −14°C. to −11° C. After the completion of the dropwise addition, 0.145 g of methanol was added to the five flasks after 40 seconds, 10 minutes, 30 minutes, 1 hour, and 2.5 hours, respectively, to terminate the reaction. For each of the resulting solutions, the polymerization conversion ratio was determined by the method described above. FIG. 1A shows a graph obtained by plotting the polymerization conversion ratio with respect to time.

<Polymerization Conversion Ratio of n-butyl Acrylate>

(1) The interior of a 500-mL Schlenk flask equipped with a three-way stopcock was purged with nitrogen. Subsequently, 199 g of toluene, 0.148 g of HMTETA, and 2.68 g of a toluene solution containing 1.35 mmol of IBT were added to the flask at room temperature. Furthermore, 0.344 g of a mixed solution of cyclohexane and n-hexane containing 0.586 mmol of s-BuLi was added thereto.

Figure 1B:
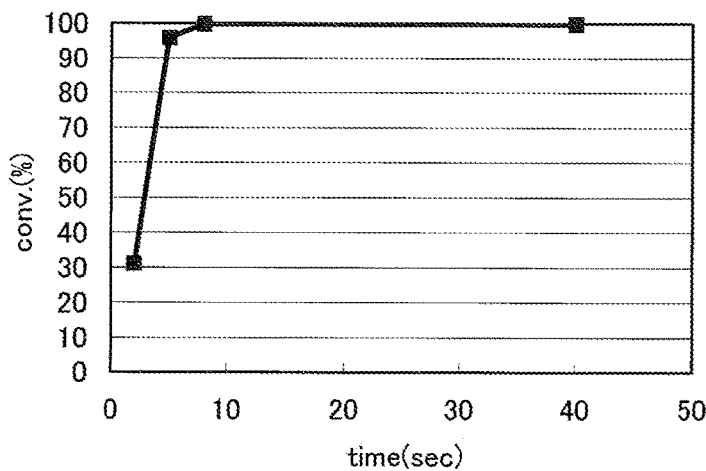

(2) To each of four 100-ml, three-necked flasks, the interior of which was purged with nitrogen, 25.4 g of the solution prepared in (1) was added at room temperature. Subsequently, the resulting polymerization solution was cooled, and 0.459 g of n-butyl acrylate (hereinafter referred to as "n-BA") was added to each of the flasks at an internal temperature of −14° C. to −11°C. After the completion of the dropwise addition, 0.145 g of methanol was added to the four flasks after 2 seconds, 5 seconds, 8 seconds, and 40 seconds, respectively, to terminate the reaction. For each of the resulting solutions, the polymerization conversion ratio was determined by the method described above. FIG. 1B shows a graph obtained by plotting the polymerization conversion ratio with respect to time.

FIG. 1A and FIG. 1B show that the time (minutes) until the polymerization conversion ratio of methyl methacrylate reaches about 100% is significantly different from the time (seconds) until the polymerization conversion ratio of n-butyl acrylate reaches about 100%. These results show that the reactivity ratio of methyl methacrylate is significantly different from the reactivity ratio of n-butyl acrylate. Accordingly, these results suggest that in the case where a mixture of a methacrylic acid ester and an acrylic acid ester that are similar to these monomers is polymerized, a gradient structure is formed.

Synthesis Example 1

Synthesis of Block Copolymer (I-1)

(1) The interior of a 100-mL Schlenk flask equipped with a three-way stopcock was purged with nitrogen. Subsequently, 32.0 g of toluene, 0.239 g of HMTETA, and 4.52 g of a toluene solution containing 2.28 mmol of IBT were added to the flask at room temperature. Furthermore, 0.580 g of a mixed solution of cyclohexane and n-hexane containing 0.989 mmol of s-BuLi was added thereto. Subsequently, the resulting polymerization solution was cooled, and 6.94 g of MMA was added dropwise so that the internal temperature became +10° C. to +30° C. The color of the reaction solution was yellow at first, but after stirring for 60 minutes at room temperature, the reaction solution became colorless. The polymerization conversion ratio of MMA at this time was 99.9% or more.

(2) To a 100-mL three-necked flask, the interior of which was purged with nitrogen, 40.8 g of toluene and 6.08 g of the solution prepared in (1) were added at room temperature. Subsequently, the resulting polymerization solution was cooled, and 0.477 g of a monomer mixture of <MMA/n-BA=13.3/86.7 (weight ratio)> was added thereto at an internal temperature of −14° C. to −11° C. 15 times (total 7.15 g) at an interval of 20 seconds. After the completion of the addition, stirring was conducted at −15° C. for three minutes. The polymerization conversion ratio of MMA at this time was 20.7%. The temperature of the resulting reaction solution was increased to +40° C., and stirring was conducted for 2 hours and 30 minutes. Subsequently, 0.526 g of methanol was added to terminate the polymerization reaction. The polymerization conversion ratio of n-BA and MMA at this time was 99.9% or more. The reaction solution was poured into 1 L of methanol to form a white precipitate. The white precipitate was then collected by filtration and dried to obtain 6.0 g of a block copolymer [hereinafter referred to as "block copolymer (I-1)"].

(3) For the block copolymer (I-1) obtained in (2) above, $^1$H-NMR measurement and GPC measurement were conducted. According to the results, the block copolymer (I-1) had a weight-average molecular weight (Mw) of 78,400, a number-average molecular weight (Mn) of 67,600, and a molecular weight distribution (Mw/Mn) of 1.16. Regarding the content of each copolymerization component in the block copolymer (I-1), the content of MMA was 19.9% by mass, and the content of n-BA was 80.1% by mass. By adding MMA and n-BA at the same time in the form of a mixture as described above, a block copolymer having the structure described below is formed because the rate of polymerization of n-BA is higher than the rate of polymerization of MMA.

(polymer block composed of structural unit derived from MMA)-(gradient copolymer block which is copolymer block derived from MMA and n-BA and in which copolymerization ratio of MMA continuously increases)-(polymer block composed of structural unit derived from MMA)

In Table 2 below, the structure of the block copolymer obtained by this polymerization method is abbreviated as [A1]-[B/A2]. As shown in FIG. 2, in the $^{13}$C-NMR analysis of the resulting block copolymer, clear peaks due to copolymerization were confirmed in the vicinity of 18.0 ppm and in the vicinity of 20.0 ppm. These results confirmed that a gradient structure was formed.

Synthesis Example 2

Synthesis of Block Copolymer (I-2)

(1) The interior of a 100-mL Schlenk flask equipped with a three-way stopcock was purged with nitrogen. Subsequently, 30.3 g of toluene, 0.219 g of HMTETA, and 6.31 g of a toluene solution containing 3.17 mmol of IBT were added to the flask at room temperature. Furthermore, 0.532 g of a mixed solution of cyclohexane and n-hexane containing 0.906 mmol of s-BuLi was added thereto. Subsequently, the resulting polymerization solution was cooled, and 6.25 g of MMA was added dropwise so that the internal temperature became +10° C. to +30° C. The color of the reaction solution was yellow at first, but after stirring for 60 minutes at room temperature, the reaction solution became colorless. The polymerization conversion ratio of MMA at this time was 99.9% or more.

(2) To a 100-mL three-necked flask, the interior of which was purged with nitrogen, 41.8 g of toluene and 4.81 g of the solution prepared in (1) were added at room temperature. Subsequently, the resulting polymerization solution was cooled, and 0.494 g of a monomer mixture of <MMA/n-BA=15.2/84.8 (weight ratio)> was added thereto at an internal temperature of −12° C. to −5° C. 15 times (total 7.41 g) at an interval of 20 seconds. After the completion of the addition, stirring was conducted at −15° C. for three minutes. The temperature of the resulting reaction solution was increased to +40° C., and stirring was conducted for 4 hours and 30 minutes. Subsequently, 0.502 g of methanol was added to terminate the polymerization reaction. The polymerization conversion ratio of n-BA and MMA at this time was 99.9% or more. The reaction solution was poured into 1 L of methanol to form a white precipitate. The white precipitate was then collected by filtration and dried to obtain 6.5 g of a block copolymer [hereinafter referred to as "block copolymer (I-2)"].

(3) For the block copolymer (I-2) obtained in (2) above, $^1$H-NMR measurement and GPC measurement were conducted. According to the results, the block copolymer (I-2) had a weight-average molecular weight (Mw) of 150,000, a number-average molecular weight (Mn) of 116,000, and a molecular weight distribution (Mw/Mn) of 1.29. Regarding the content of each copolymerization component in the block copolymer (I-2), the content of MMA was 21.3% by mass, and the content of n-BA was 78.7% by mass. In the $^{13}$C-NMR analysis of the resulting block copolymer, clear peaks due to copolymerization were confirmed in the vicinity of 18.0 ppm and in the vicinity of 20.0 ppm. These results confirmed that the following block copolymer having a gradient structure was formed as in Synthesis Example 1.
(polymer block composed of structural unit derived from MMA)-(gradient copolymer block which is copolymer block derived from MMA and n-BA and in which copolymerization ratio of MMA continuously increases)-(polymer block composed of structural unit derived from MMA)

In Table 2 below, the structure of the block copolymer obtained by this polymerization method is abbreviated as [A1]-[B/A2].

Synthesis Example 3

Synthesis of Block Copolymer (I-3)

(1) To a 100-mL Schlenk flask, the interior of which was purged with nitrogen, 30.2 g of toluene, 0.299 g of HMTETA, and 6.15 g of a toluene solution containing 3.09 mmol of IBT were added at room temperature. Furthermore, 0.726 g of a mixed solution of cyclohexane and n-hexane containing 1.24 mmol of s-BuLi was added thereto. Subsequently, the resulting polymerization solution was cooled, and 6.16 g of MMA was added dropwise so that the internal temperature became +10° C. to +30° C. The color of the reaction solution was yellow at first, but after stirring for 60 minutes at room temperature, the reaction solution became colorless. The polymerization conversion ratio of MMA at this time was 99.9% or more.

(2) To a 100-mL three-necked flask, the interior of which was purged with nitrogen, 40.2 g of toluene and 6.68 g of the solution prepared in (1) were added at room temperature. Subsequently, the resulting polymerization solution was cooled, and 0.477 g of a monomer mixture of <MMA/n-BA/2-ethylhexyl acrylate (hereinafter referred to as 2EHA) =12.3/42.4/45.3 (weight ratio)> was added thereto at an internal temperature of −12° C. to −8° C. 15 times (total 7.16 g) at an interval of 20 seconds. After the completion of the dropwise addition, stirring was conducted at −15° C. for three minutes. The temperature of the resulting reaction solution was increased to +40° C., and stirring was conducted for 2 hours and 30 minutes. Subsequently, 0.772 g of methanol was added to terminate the polymerization reaction. The polymerization conversion ratio of n-BA, 2EHA, and MMA at this time was 99.9% or more. The reaction solution was poured into 1 L of methanol to form a white precipitate. The white precipitate was then collected by filtration and dried to obtain 6.7 g of a block copolymer [hereinafter referred to as "block copolymer (I-3)"].

(3) For the block copolymer (I-3) obtained in (2) above, $^1$H-NMR measurement and GPC measurement were conducted. According to the results, the block copolymer (I-3) had a weight-average molecular weight (Mw) of 53,800, a number-average molecular weight (Mn) of 48,400, and a molecular weight distribution (Mw/Mn) of 1.11. Regarding the content of each copolymerization component in the block copolymer (I-3), the content of MMA was 21.2% by mass, and the total content of n-BA and 2EHA was 78.8% by mass. By adding MMA, n-BA, and 2EHA at the same time in the form of a mixture as described above, a block copolymer having the structure described below is formed because the rate of polymerization of n-BA and 2EHA is higher than the rate of polymerization of MMA.
(polymer block composed of structural unit derived from MMA)-(gradient copolymer block which is copolymer block derived from MMA, n-BA, and 2EHA and in which copolymerization ratio of MMA continuously increases)-(polymer block composed of structural unit derived from MMA)

In Table 2 below, the structure of the block copolymer obtained by this polymerization method is abbreviated as [A1]-[B/A2]. In the $^{13}$C-NMR analysis of the resulting block copolymer, clear peaks due to copolymerization were confirmed in the vicinity of 18.0 ppm and in the vicinity of 20.0 ppm. These results confirmed that a gradient structure was formed.

Synthesis Example 4

Synthesis of Block Copolymer (I-4)

(1) To a 100-mL Schlenk flask, the interior of which was purged with nitrogen, 28.5 g of toluene, 0.219 g of HMTETA, and 8.11 g of a toluene solution containing 4.08 mmol of IBT were added at room temperature. Furthermore, 0.532 g of a mixed solution of cyclohexane and n-hexane containing 0.906 mmol of s-BuLi was added thereto. Subsequently, the resulting polymerization solution was cooled, and 6.51 g of MMA was added dropwise so that the internal temperature became +10° C. to +30° C. The color of the reaction solution was yellow at first, but after stirring for 60 minutes at room temperature, the reaction solution became colorless. The polymerization conversion ratio of MMA at this time was 99.9% or more.

(2) To a 100-mL three-necked flask, the interior of which was purged with nitrogen, 41.8 g of toluene and 4.81 g of the solution prepared in (1) were added at room temperature. Subsequently, the resulting polymerization solution was cooled, and 0.493 g of a monomer mixture of <MMA/n-BA/2EHA=14.7/41.3/44.1 (weight ratio)> was added thereto at an internal temperature of −13° C. to −10° C. 15 times (total 7.39 g) at an interval of 20 seconds. After the completion of the addition, stirring was conducted at −15° C. for three minutes. The temperature of the resulting reaction solution was increased to +40° C., and stirring was conducted for 4 hours and 30 minutes. Subsequently, 0.595 g of methanol was added to terminate the polymerization reaction. The polymerization conversion ratio of n-BA, 2EHA, and MMA at this time was 99.9% or more. The reaction solution was poured into 1 L of methanol to form a white precipitate. The white precipitate was then collected by filtration and dried to obtain 6.4 g of a block copolymer [hereinafter referred to as "block copolymer (I-4)"].

(3) For the block copolymer (I-4) obtained in (2) above, $^1$H-NMR measurement and GPC measurement were conducted. According to the results, the block copolymer (I-4) had a weight-average molecular weight (Mw) of 128,000, a number-average molecular weight (Mn) of 104,000, and a molecular weight distribution (Mw/Mn) of 1.23. Regarding the content of each copolymerization component in the block copolymer (I-4), the content of MMA was 20.0% by mass, and the total content of n-BA and 2EHA was 80.0% by mass. In the $^{13}$C-NMR analysis of the resulting block copolymer, clear peaks due to copolymerization were confirmed in the vicinity of 18.0 ppm and in the vicinity of 20.0 ppm. These results confirmed that the following block copolymer having a gradient structure was formed as in Synthesis Example 3.
(polymer block composed of structural unit derived from MMA)-(gradient copolymer block which is copolymer block derived from MMA, n-BA, and 2EHA and in which copolymerization ratio of MMA continuously increases)-(polymer block composed of structural unit derived from MMA)

In Table 2 below, the structure of the block copolymer obtained by this polymerization method is abbreviated as [A1]-[B/A2].

Synthesis Example 5

Synthesis of Block Copolymer (I-5)

(1) The interior of a 100-mL Schlenk flask equipped with a three-way stopcock was purged with nitrogen. Subsequently, 32.4 of toluene, 0.196 g of HMTETA, and 6.45 g of a toluene solution containing 3.24 mmol of IBT were added to the flask at room temperature. Furthermore, 0.476 g of a mixed solution of cyclohexane and n-hexane containing 0.810 mmol of s-BuLi was added thereto. Subsequently, the resulting polymerization solution was cooled, and 3.59 g of MMA was added dropwise so that the internal temperature became +10° C. to +30° C. The color of the reaction solution was yellow at first, but after stirring for 60 minutes at room temperature, the reaction solution became colorless. The polymerization conversion ratio of MMA at this time was 99.9% or more.

(2) To a 100-mL three-necked flask, the interior of which was purged with nitrogen, 38.5 g of toluene and 6.45 g of the solution prepared in (1) were added at room temperature. Subsequently, the resulting polymerization solution was cooled, and a monomer mixture of <MMA/2EHA=8.5/91.5 (weight ratio)> was added thereto at an internal temperature of −16° C. to −13° C. 14 times in a divided manner at an interval of 40 seconds. In this case, in each of the first addition to the fifth addition, 0.665 g of the monomer mixture was added. In each of the sixth addition to the ninth addition, 0.478 g of the monomer mixture was added. In each of the tenth addition to the twelfth addition, 0.349 g of the monomer mixture was added. In each of the thirteenth addition and the fourteenth addition, 0.206 g of the monomer mixture was added (total 6.70 g). After the completion of the addition, stirring was conducted at −15° C. for three minutes. The temperature of the resulting reaction solution was increased to +40° C., and stirring was conducted for 2 hours. Subsequently, 0.641 g of methanol was added to terminate the polymerization reaction. The polymerization conversion ratio of 2EHA and MMA at this time was 99.9% or more. The reaction solution was poured into 1 L of methanol to form a white precipitate. The white precipitate was then collected by filtration and dried to obtain 7.3 g of a block copolymer [hereinafter referred to as "block copolymer (I-5)"].

(3) For the block copolymer (1-5) obtained in (2) above, $^1$H-NMR measurement and GPC measurement were conducted. According to the results, the block copolymer (I-5) had a weight-average molecular weight (Mw) of 74,100, a number-average molecular weight (Mn) of 61,400, and a molecular weight distribution (Mw/Mn) of 1.21. Regarding the content of each copolymerization component in the block copolymer (I-5), the content of MMA was 22.1% by mass, and the content of 2EHA was 77.9% by mass. By adding MMA and 2EHA at the same time in the form of a mixture as described above, a block copolymer having the structure described below is formed because the rate of polymerization of 2EHA is higher than the rate of polymerization of MMA.

(polymer block composed of structural unit derived from MMA)-(gradient copolymer block which is copolymer block derived from MMA and 2EHA and in which copolymerization ratio of MMA continuously increases)-(polymer block composed of structural unit derived from MMA)

In Table 2 below, the structure of the block copolymer obtained by this polymerization method is abbreviated as [A1]-[B/A2]. In the $^{13}$C-NMR analysis of the resulting block copolymer, clear peaks due to copolymerization were confirmed in the vicinity of 18.0 ppm and in the vicinity of 20.0 ppm. These results confirmed that a gradient structure was formed.

Synthesis Example 6

Synthesis of Block Copolymer (C-1)

(1) The interior of a 2-L three-necked flask was purged with nitrogen, and 949 g of toluene and 43.9 g of 1,2-dimethoxyethane were then added to the flask at room temperature. Subsequently, 21.2 g of a toluene solution containing 10.6 mmol of IBT was added, and 2.97 g of a mixed solution of cyclohexane and n-hexane containing 5.06 mmol of s-BuLi was further added thereto. Subsequently, 68.9 g of MMA was added to the resulting mixture. The color of the reaction solution was yellow at first, but after stirring for 60 minutes at room temperature, the reaction solution became colorless. The polymerization conversion ratio of MMA at this time was 99.9% or more. Next, the reaction mixed solution was cooled to −30° C., and 260 g of n-BA was added dropwise over a period of two hours. After the completion of the dropwise addition, stirring was conducted for five minutes at −30° C. Subsequently, 9.49 g of methanol was added to terminate the polymerization reaction. The polymerization conversion ratio of n-BA at this time was 99.9% or more. The resulting reaction solution was poured into 15 kg of methanol to form a white precipitate. The white precipitate was collected by filtration and dried to obtain 310 g of a block copolymer [hereinafter referred to as "block copolymer (C-1)"].

(2) For the block copolymer (C-1) obtained above, $^1$H-NMR measurement and GPC measurement were conducted. According to the results, the block copolymer (C-1) had a weight-average molecular weight (Mw) of 75,000, a number-average molecular weight (Mn) of 67,000, and a molecular weight distribution (Mw/Mn) of 1.12. Regarding the content of each copolymerization component in the acrylic block copolymer (C-1), the content of MMA was 19.9% by mass, and the content of n-BA was 80.1% by mass.

Synthesis Example 7

Synthesis of Block Copolymer (C-2)

(1) The interior of a 2-L three-necked flask was purged with nitrogen, and 840 g of toluene and 49.2 g of 1,2-dimethoxyethane were then added to the flask at room temperature. Subsequently, 90.2 g of a toluene solution containing 45.4 mmol of IBT was added, and 3.33 g of a mixed solution of cyclohexane and n-hexane containing 5.67 mmol of s-BuLi was further added thereto. Subsequently, 47.5 g of MMA was added to the resulting mixture. The color of the reaction solution was yellow at first, but after stirring for 60 minutes at room temperature, the reaction solution became colorless. The polymerization conversion ratio of MMA at this time was 99.9% or more. Next, the reaction mixed solution was cooled to 0° C., and 319 g of a monomer mixture of <MMA/n-BA=8.8/91.2 (weight ratio)> was added dropwise little by little over a period of 20 hours. After the completion of the addition, stirring was conducted for five minutes at 0° C. Subsequently, 10.4 g of methanol was added to terminate the polymerization reaction. The polymerization conversion ratio of n-BA and MMA at this time was 99.9% or more. The resulting reaction solution was poured into 15 kg of methanol to form a white precipitate. The white precipitate was collected by filtration and dried to obtain 345 g of a block copolymer [hereinafter referred to as "block copolymer (C-2)"].

(2) For the block copolymer (C-2) obtained above, $^1$H-NMR measurement and GPC measurement were conducted. According to the results, the block copolymer (C-2) had a weight-average molecular weight (Mw) of 76,000, a number-average molecular weight (Mn) of 50,300, and a molecular weight distribution (Mw/Mn) of 1.51. Regarding the content of each copolymerization component in the acrylic block copolymer (C-2), the content of MMA was 19.9% by mass, and the content of n-BA was 80.1% by mass. Since the monomer mixture of MMA and n-BA is polymerized by dropping little by little at a rate that is sufficiently lower than the rate of polymerization of the two monomers, a block copolymer having the structure described below is formed regardless of the copolymerization reactivity ratios of MMA and n-BA.
(polymer block composed of structural unit derived from MMA)-(random copolymer block which is copolymer block derived from MMA and n-BA and in which MMA and n-BA are randomly copolymerized)

In Table 2 below, the structure of the block copolymer obtained by this polymerization method is abbreviated as [A1]-[B-r-A2].

Synthesis Example 8

Synthesis of Block Copolymer (C-3)

(1) The interior of a 2-L three-necked flask was purged with nitrogen, and 938 g of toluene and 1.33 g of HMTETA were then added to the flask at room temperature. Subsequently, 31.4 g of a toluene solution containing 15.8 mmol of IBT was added, and 3.09 g of a mixed solution of cyclohexane and n-hexane containing 5.26 mmol of s-BuLi was further added thereto. Subsequently, the reaction mixed solution was cooled, and 19.0 g of a monomer mixture of <MMA/n-BA=8.8/91.2 (weight ratio)> was added thereto at an internal temperature of −15° C. to −10° C. 15 times (total 285 g) at an interval of 20 seconds. After the completion of the addition, stirring was conducted at −15° C. for three minutes. The temperature of the reaction mixed solution was increased to +40° C., and stirring was conducted for 3 hours. The polymerization conversion ratio of n-BA and MMA at this time was 99.9% or more. Next, 39.9 g of MMA was added to the reaction mixed solution. The color of the reaction solution was yellow at first, but after stirring for 5 hours at +40° C., the reaction solution became colorless. To the reaction solution, 12.1 g of methanol was added to terminate the polymerization reaction. The polymerization conversion ratio of MMA at this time was 99.9% or more. The resulting reaction solution was poured into 15 kg of methanol to form a white precipitate. The white precipitate was then collected by filtration and dried to obtain 410 g of a block copolymer [hereinafter referred to as "block copolymer (C-3)"].

(2) For the block copolymer (C-3) obtained above, $^1$H-NMR measurement and GPC measurement were conducted. According to the results, the block copolymer (C-3) had a weight-average molecular weight (Mw) of 75,500, a number-average molecular weight (Mn) of 53,200, and a molecular weight distribution (Mw/Mn) of 1.42. Regarding the content of each copolymerization component in the acrylic block copolymer (C-3), the content of MMA was 19.9% by mass, and the content of n-BA was 80.1% by mass. A block copolymer having the structure described below is formed by conducting this polymerization because the rate of polymerization of n-BA is higher than the rate of polymerization of MMA.
(gradient copolymer block which is copolymer block derived from MMA and n-BA and in which copolymerization ratio of MMA continuously increases)-(polymer block composed of structural unit derived from MMA)

In Table 2 below, the structure of the block copolymer obtained by this polymerization method is abbreviated as [B/A2]-[A1].

Synthesis Example 9

Synthesis of Block Copolymer (C-4)

(1) The interior of a 2-L three-necked flask was purged with nitrogen, and 840 g of toluene and 49.2 g of 1,2-dimethoxyethane were then added to the flask at room temperature. Subsequently, 90.2 g of a toluene solution containing 45.4 mmol of IBT was added, and 3.33 g of a mixed solution of cyclohexane and n-hexane containing 5.67 mmol of s-BuLi was further added thereto. Subsequently, 47.5 g of MMA was added to the resulting mixed solution. The color of the reaction solution was yellow at first, but after stirring for 60 minutes at room temperature, the reaction solution became colorless. The polymerization conversion ratio of MMA at this time was 99.9% or more. Next, the reaction mixed solution was cooled to 0° C., and 319 g of a monomer mixture of MMA and n-BA was added dropwise over a period of 20 hours. In this step, first, the monomer mixture was dropped at a ratio of MMA/n-BA=100/0. The ratio of n-BA was gradually increased so that the ratio MMA/n-BA became 0/100 in the middle of the step. Toward the end of the step, the ratio of MMA was again increased so that the ratio MMA/n-BA became 100/0 again at the end. The total charging ratio of the monomer mixture was <MMA/n-BA=8.8/91.2 (weight ratio)>. After the completion of the dropwise addition, stirring was conducted for five minutes at 0° C. Subsequently, 10.4 g of methanol was added to terminate the polymerization reaction. The polymerization conversion ratio of n-BA and MMA at this time was 99.9% or more. The resulting reaction solution was poured into 15 kg of methanol to form a white precipitate. The white precipitate was collected by filtration and dried to obtain 335 g of a block copolymer [hereinafter referred to as "block copolymer (C-4)"].

(2) For the block copolymer (C-4) obtained above, $^1$H-NMR measurement and GPC measurement were conducted. According to the results, the block copolymer (C-4) had a weight-average molecular weight (Mw) of 76,500, a number-average molecular weight (Mn) of 48,400, and a molecular weight distribution (Mw/Mn) of 1.58. Regarding the content of each copolymerization component in the acrylic block copolymer (C-4), the content of MMA was 19.9% by mass, and the content of n-BA was 80.1% by mass. Since the monomer mixture of MMA and n-BA is polymerized over a long time while changing the monomer ratio, a block copolymer having the structure described below is formed.
(polymer block composed of structural unit derived from MMA)-(gradient copolymer block which is copolymer block derived from MMA and n-BA and in which copolymerization ratio of n-BA continuously increases)-(polymer block composed of structural unit derived from n-BA)-(gradient copolymer block which is copolymer block derived from MMA and n-BA and in which copolymerization ratio of MMA continuously increases)

In Table 2 below, the structure of the block copolymer obtained by this polymerization method is abbreviated as [A1/B]-[B]-[B/A2]. Here, "[A1/B]-[B]" means that the structure includes a gradient copolymer section in which a copolymerization ratio of the acrylic acid ester (B) gradually continuously increases from a polymer section derived from only the methacrylic acid ester (A1), and a polymer block [B] derived from the acrylic acid ester (B) subsequent to the gradient copolymer section. When this structure is viewed from a section connected to the polymer block [B], [A1/B] represents a polymer block having a gradient copolymer section in which a copolymerization ratio of the methacrylic acid ester (A1) continuously increases in a direction away from the connecting section. Furthermore, [B/A2] represents a polymer block having a gradient copolymer section in which a copolymerization ratio of the methacrylic acid ester (A2) continuously increases from a section connected to the polymer block [B].

Synthesis Example 10

Synthesis of Block Copolymer (C-5)

(1) The interior of a 2-L three-necked flask was purged with nitrogen, and 868 g of toluene and 43.4 g of 1,2-dimethoxyethane were then added to the flask at room temperature. Subsequently, 60.0 g of a toluene solution containing 40.2 mmol of IBT was added, and 2.89 g of a mixed solution of cyclohexane and n-hexane containing 5.00 mmol of s-BuLi was further added thereto. Subsequently, 35.9 g of MMA was added to the resulting mixed solution. The color of the reaction solution was yellow at first, but after stirring for 60 minutes at room temperature, the reaction solution became colorless. The polymerization conversion ratio of MMA at this time was 99.9% or more. Next, the reaction mixed solution was cooled to −30° C., and 240 g of n-BA was added dropwise over a period of two hours. After the completion of the dropwise addition, stirring was conducted for five minutes at −30° C. The polymerization conversion ratio of n-BA at this time was 99.9% or more. Subsequently, 35.9 g of MMA was added to the reaction mixed solution, and the resulting mixed solution was stirred for one night at room temperature. Subsequently, 3.50 g of methanol was added to terminate the polymerization reaction. The polymerization conversion ratio of MMA at this time was 99.9% or more. The resulting reaction solution was poured into 15 kg of methanol to form a white precipitate. The white precipitate was collected by filtration and dried to obtain 255 g of a block copolymer [hereinafter referred to as "block copolymer (C-5)"].

(2) For the block copolymer (C-5) obtained above, $^1$H-NMR measurement and GPC measurement were conducted. According to the results, the block copolymer (C-5) had a weight-average molecular weight (Mw) of 78,400, a number-average molecular weight (Mn) of 72,600, and a molecular weight distribution (Mw/Mn) of 1.08. Regarding the content of each copolymerization component in the block copolymer (C-5), the content of MMA was 23.5% by mass, and the content of n-BA was 76.5% by mass.

Synthesis Example 11

Synthesis of Block Copolymer (C-6)

(1) The interior of a 2-L three-necked flask was purged with nitrogen, and 868 g of toluene and 43.4 g of 1,2-dimethoxyethane were then added to the flask at room temperature. Subsequently, 60.0 g of a toluene solution containing 40.2 mmol of IBT was added, and 2.07 g of a mixed solution of cyclohexane and n-hexane containing 3.54 mmol of s-BuLi was further added thereto. Subsequently, 36.6 g of MMA was added to the mixed solution. The color of the reaction solution was yellow at first, but after stirring for 60 minutes at room temperature, the reaction solution became colorless. The polymerization conversion ratio of MMA at this time was 99.9% or more. Next, the reaction mixed solution was cooled to −30° C., and 251.9 g of n-BA was added dropwise over a period of two hours. After the completion of the dropwise addition, stirring was conducted for five minutes at −30° C. The polymerization conversion ratio of n-BA at this time was 99.9% or more. Subsequently, 36.6 g of MMA was added to the reaction mixed solution, and the resulting mixed solution was stirred for one night at room temperature. Subsequently, 3.50 g of methanol was added to terminate the polymerization reaction. The polymerization conversion ratio of MMA at this time was 99.9% or more. The resulting reaction solution was poured into 15 kg of methanol to form a white precipitate. The white precipitate was collected by filtration and dried to obtain 310 g of a block copolymer [hereinafter referred to as "block copolymer (C-6)"].

(2) For the block copolymer (C-6) obtained above, $^1$H-NMR measurement and GPC measurement were conducted. According to the results, the block copolymer (C-6) had a weight-average molecular weight (Mw) of 109,000, a number-average molecular weight (Mn) of 84,500, and a molecular weight distribution (Mw/Mn) of 1.29. Regarding the content of each copolymerization component in the block copolymer (C-6), the content of MMA was 22.5% by mass, and the content of n-BA was 77.5% by mass.

Synthesis Example 12

Synthesis of Block Copolymer (C-7)

(1) The interior of a 2-L three-necked flask was purged with nitrogen, and 1,046 g of toluene and 37.8 g of 1,2-dimethoxyethane were then added to the flask at room temperature. Subsequently, 31.2 g of a toluene solution containing 15.7 mmol of IBT was added, and 1.81 g of a mixed solution of cyclohexane and n-hexane containing 3.08 mmol of s-BuLi was further added thereto. Subsequently, 31.4 g of MMA was added to the mixed solution. The color of the reaction solution was yellow at first, but after stirring for 60 minutes at room temperature, the reaction solution became colorless. The polymerization conversion ratio of MMA at this time was 99.9% or more. Next, the reaction mixed solution was cooled to −30° C., and 168 g of a monomer mixture of <n-BA/2EHA=38.7/41.3 (weight ratio)> was added dropwise over a period of two hours. After the completion of the dropwise addition, stirring was conducted for five minutes at −30° C. The polymerization conversion ratio of n-BA and 2EHA at this time was 99.9% or more. Subsequently, 36.9 g of MMA was added to the reaction mixed solution, and the mixed solution was stirred for one night at room temperature. Subsequently, 10.2 g of methanol was added to terminate the polymerization reaction. The polymerization conversion ratio of MMA at this time was 99.9% or more. The resulting reaction solution was poured into 15 kg of methanol to form a white precipitate. The white precipitate was collected by filtration and dried to obtain 175 g of a block copolymer [hereinafter referred to as "block copolymer (C-7)"].

(2) For the block copolymer (C-7) obtained above, 1H-NMR measurement and GPC measurement were conducted. According to the results, the block copolymer (C-7) had a weight-average molecular weight (Mw) of 115,000, a number-average molecular weight (Mn) of 105,000, and a molecular weight distribution (Mw/Mn) of 1.09. Regarding the content of each copolymerization component in the block copolymer (C-7), the content of MMA was 20.0% by mass, and the total content of n-BA and 2EHA was 80.0 by mass.

Table 2 below summarizes the results of the block copolymers (I-1) to (I-5) and the block copolymers (C-1) to (C-7) prepared in Synthesis Examples 1 to 12 described above. FIG. 2 and FIG. 3 show $^{13}$C-NMR spectra of the block copolymers (I-1) and (C-5) prepared in Synthesis Examples 1 and 10, respectively.

TABLE 2

| | | Block copolymer | | | | |
|---|---|---|---|---|---|---|
| Synthesis Example | | 1 | 2 | 3 | 4 | 5 |
| Block copolymer | | I-1 | I-2 | I-3 | I-4 | I-5 |
| Structure | | [A1]-[B/A2] | [A1]-[B/A2] | [A1]-[B/A2] | [A1]-[B/A2] | [A1]-[B/A2] |
| Methacrylic acid ester (A1) (1) | | MMA | MMA | MMA | MMA | MMA |
| Methacrylic acid ester (A2) (1) | | MMA | MMA | MMA | MMA | MMA |
| Acrylic acid ester (B) (1) | | nBA | nBA | nBA 2EHA | nBA 2EHA | 2EHA |
| Monomer sequence distribution {AAB/(AAB + BAB} | | 0.217 | 0.440 | 0.317 | 0.300 | 0.363 |
| Content of structural unit derived from methacrylic acid ester (A1) | [mass %] | 12.3 | 12.1 | 12.0 | 9.1 | 10.0 |
| Content of structural unit derived from methacrylic acid ester (A2) | [mass %] | 7.6 | 9.2 | 9.2 | 10.9 | 12.1 |
| Content of structural unit derived from acrylic acid ester (B) (2) | [mass %] | 80.1 | 78.7 | nBA 38.1 2EHA 40.7 | nBA 38.7 2EHA 41.3 | 77.9 |
| Weight-average molecular weight (Mw) | | 78,400 | 150,000 | 53,800 | 128,000 | 74,100 |
| Molecular weight distribution (Mw/Mn) | | 1.16 | 1.29 | 1.11 | 1.23 | 1.21 |
| Triad syndiotacticity (rr) of polymer block [A1] | % | 69 | 68 | 68 | 70 | 69 |

| | | 6 | 7 | 8 | 9 | 10 | 11 | 12 |
|---|---|---|---|---|---|---|---|---|
| Synthesis Example | | | | | | | | |
| Block copolymer | | C-1 | C-2 | C-3 | C-4 | C-5 | C-6 | C-7 |
| Structure | | [A1]-[B] | [A1]-[B-r-A2] | [B/A2]-[A1] | [A1/B]-[B]-[B/A2] | [A1]-[B]-[A2] | [A1]-[B]-[A2] | [A1]-[B]-[A2] |
| Methacrylic acid ester (A1) (1) | | MMA | MMA | MMA | MMA | MMA | MMA | MMA |
| Methacrylic acid ester (A2) (1) | | — | MMA | MMA | MMA | MMA | MMA | MMA |
| Acrylic acid ester (B) (1) | | nBA | nBA | nBA | nBA | nBA | nBA | nBA 2EHA |
| Monomer sequence distribution {AAB/(AAB + BAB} | | Not detected | 0.074 | 0.217 | 0.352 | Not detected | Not detected | Not detected |
| Content of structural unit derived from methacrylic acid ester (A1) | [mass %] | 19.9 | 12.3 | 12.3 | 12.3 | 11.8 | 8.8 | 9.1 |
| Content of structural unit derived from methacrylic acid ester (A2) | [mass %] | — | 7.6 | 7.6 | 7.6 | 11.8 | 13.7 | 10.9 |
| Content of structural unit derived from acrylic acid ester (B) (2) | [mass %] | 80.1 | 80.1 | 80.1 | 80.1 | 76.5 | 77.5 | nBA 38.7 2EHA 41.3 |
| Weight-average molecular weight (Mw) | | 75,000 | 76,000 | 75,500 | 76,500 | 78,400 | 109,000 | 115,000 |
| Molecular weight distribution (Mw/Mn) | | 1.12 | 1.51 | 1.42 | 1.58 | 1.08 | 1.29 | 1.09 |
| Triad syndiotacticity (rr) of polymer block [A1] | % | 69 | 68 | 68 | 69 | 69 | 69 | 70 |

(1) MMA represents methyl methacrylate, nBA represents n-butyl acrylate, and 2EHA represents 2-ethylhexyl acrylate.
(2) In the case of a system in which nBA and 2EHA were used in combination, the content of a structural unit derived from each monomer was converted from a charged monomer ratio and the total content of acrylic acid esters in the resulting polymer.

Examples 1 to 8 and Comparative Examples 1 to 8

The block copolymers (I-1) to (I-5) and the block copolymers (C-1) to (C-7) synthesized in Synthesis Examples 1 to 12 above, a tackifying resin (Pinecrystal KE-311, manufactured by Arakawa Chemical Industries, Ltd.), and a plasticizer (Arufon UP1000, manufactured by Toagosei Co., Ltd.) were dissolved in toluene in the mass ratios shown in Table 3 below to prepare toluene solutions each having a concentration of 35% by mass. A polyethylene terephthalate film (Toyobo Ester Film E5000, thickness: 50 μm) was coated with the toluene solution using a coater such that an adhesive layer after drying had a thickness of 25 μm. The film was then subjected to drying/heat treatment at 60° C. for 30 minutes to prepare an adhesive tape. In the evaluation of the prepared adhesive tape, when it was necessary to allow the adhesive tape to adhere to an adherend, a roller of 2 kg was moved back and forth twice to allow the tape to adhere to the adherend at a rate of 10 mm/second, followed by the evaluation.

Various properties of the resulting adhesive tapes were evaluated by the methods described above. The results are shown in Table 3 below.

TABLE 3

| | Composition and properties | | | | | | | |
|---|---|---|---|---|---|---|---|---|
| | Example 1 | Example 2 | Example 3 | Example 4 | Example 5 | Example 6 | Example 7 | Example 8 |
| [Composition] | | | | | | | | |
| Block copolymer (I-1) | 100 | | | | | | | |
| Block copolymer (I-2) | | 100 | | | | | | |
| Block copolymer (I-3) | | | 100 | | | | | |
| Block copolymer (I-4) | | | | 100 | 100 | 100 | 100 | |

TABLE 3-continued

Composition and properties

|  |  |  |  |  |  |  |  |  |  |
|---|---|---|---|---|---|---|---|---|---|
| Block copolymer (I-5) |  |  |  |  |  |  |  |  | 100 |
| Block copolymer (C-1) |  |  |  |  |  |  |  |  |  |
| Block copolymer (C-2) |  |  |  |  |  |  |  |  |  |
| Block copolymer (C-3) |  |  |  |  |  |  |  |  |  |
| Block copolymer (C-4) |  |  |  |  |  |  |  |  |  |
| Block copolymer (C-5) |  |  |  |  |  |  |  |  |  |
| Block copolymer (C-6) |  |  |  |  |  |  |  |  |  |
| Block copolymer (C-7) |  |  |  |  |  |  |  |  |  |
| Tackifying resin |  |  |  |  |  |  | 35 | 60 | 35 |
| Plasticizer |  |  |  |  |  |  |  |  | 50 |
| [Properties] |  |  |  |  |  |  |  |  |  |
| 180-degree peel strength (SUS) | [N/25 mm] | 19.0 | 17.3 | 12.6 | 14.9 | 16.3 | 20.6 | 13.2 | 13.1 |
|  | Residual adhesive after peeling | Not observed | Not observed | Not observed | Not observed | Not observed | Not observed | Not observed | Not observed |
| Holding power | Falling time [min] | >1,000 | >1,000 | >1,000 | >1,000 | >1,000 | >1,000 | >1,000 | >1,000 |
|  | Displacement distance [mm] | 0.5 | 0.0 | 0.7 | 0.0 | 0.0 | 0.0 | 1.0 | 0.0 |
| SAFT | [° C.] | 140 | 176 | 139 | 198 | 170 | 163 | 149 | 187 |
| Ball tack | [Ball No.] | 5 | 9 | 8 | 9 | 10 | 4 | 11 | 9 |
| Complex viscosity (160° C.) | [Pa · s] | 2,400 | 6,600 | 3,700 | 5,100 | 2,100 | 1,200 | 380 | 8,000 |
| (180° C.) | [Pa · s] | 1,200 | 4,800 | 1,700 | 4,200 | 1,700 | 870 | <100 | 6,500 |
| (200° C.) | [Pa · s] | 310 | 3,500 | 380 | 3,400 | 1,100 | 580 | <100 | 5,800 |
| Temperature at which tanδ = 1 | [° C.] | 171 | >200 | 193 | >200 | >200 | >200 | >200 | >200 |
| Hot-melt coating properties |  | A | B | B | B | B | A | A | C |
| 180-degree peel strength (PE) | [N/25 mm] | 0.7 | 0.9 | 0.7 | 3.4 |  |  |  | 2.3 |

|  |  | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|---|
| [Composition] |  |  |  |  |  |  |  |  |  |
| Block copolymer (I-1) |  |  |  |  |  |  |  |  |  |
| Block copolymer (I-2) |  |  |  |  |  |  |  |  |  |
| Block copolymer (I-3) |  |  |  |  |  |  |  |  |  |
| Block copolymer (I-4) |  |  |  |  |  |  |  |  |  |
| Block copolymer (I-5) |  |  |  |  |  |  |  |  |  |
| Block copolymer (C-1) |  | 100 |  |  |  |  |  |  |  |
| Block copolymer (C-2) |  |  | 100 |  |  |  |  |  |  |
| Block copolymer (C-3) |  |  |  | 100 |  |  |  |  |  |
| Block copolymer (C-4) |  |  |  |  | 100 |  |  |  |  |
| Block copolymer (C-5) |  |  |  |  |  | 100 |  |  |  |
| Block copolymer (C-6) |  |  |  |  |  |  | 100 | 100 |  |
| Block copolymer (C-7) |  |  |  |  |  |  |  |  | 100 |
| Tackifying resin |  |  |  |  |  |  |  |  | 35 |
| Plasticizer |  |  |  |  |  |  |  |  | 50 |
| [Properties] |  |  |  |  |  |  |  |  |  |
| 180-degree peel strength (SUS) | [N/25 mm] | 6.6 | 10.0 | 8.0 | 21.4 | 12.5 | 10.4 | 4.9 | 14.4 |
|  | Residual adhesive after peeling | Observed | Observed | Observed | Observed | Not observed | Not observed | Not observed | Not observed |
| Holding power | Falling time [min] | 4 | <1 | 3 | 680 | >1,000 | >1,000 | 48 | >1,000 |
|  | Displacement distance [mm] | — | — | — | — | 0.0 | 0.0 | — | 0.0 |
| SAFT | [° C.] | 97 | 65 | 80 | 122 | 151 | 165 | 123 | 185 |
| Ball tack | [Ball No.] | 6 | 2 | 5 | 6 | 4 | 6 | 8 | 8 |
| Complex viscosity (160° C.) | [Pa · s] | <100 | <100 | <100 | 1,600 | 6,100 | 9,000 | 550 | 12,000 |
| (180° C.) | [Pa · s] | <100 | <100 | <100 | 700 | 2,800 | 5,500 | 130 | 8,400 |
| (200° C.) | [Pa · s] | <100 | <100 | <100 | 160 | 970 | 3,100 | <100 | 5,600 |
| Temperature at which tanδ = 1 | [° C.] | 130 | 119 | 128 | 156 | 185 | >200 | 155 | >200 |
| Hot-melt coating properties |  | A | A | A | A | B | B | A | C |
| 180-degree peel strength (PE) | [N/25 mm] |  |  |  |  | 0.5 |  |  |  |

Com. Ex.: Comparative Example

Referring to Table 3, since the adhesives of Comparative Examples 1 and 2 were prepared by using block copolymers that did not have a gradient copolymer block section, the adhesives each had a low 180-degree peel strength to a stainless adherend, remained as a residual adhesive after peeling, and had a low holding power.

Since the adhesive of Comparative Example 3 was prepared by using a block copolymer having a gradient copolymer block section whose gradient direction was different from that of the present invention, the adhesive had a low 180-degree peel strength to a stainless adherend, remained as a residual adhesive after peeling, and had a low holding power. Similarly, the adhesive of Comparative Example 4 was prepared by using a block copolymer having a gradient copolymer block section having a structure different from that of the present invention, the adhesive remained as a residual adhesive after peeling and had a low holding power.

On the other hand, the adhesives of Comparative Examples 5, 6, and 8, which were prepared by using a triblock copolymer that did not have a gradient copolymer block section, did not remain as a residual adhesive after peeling and had a high holding power. However, comparing with Examples 1, 2, and 4 in which block copolymers having substantially the same weight-average molecular weights and having gradient copolymer block sections were used, the adhesives of Comparative Examples 5, 6, and 8 each had a low 180-degree peel strength to a stainless adherend and poor handleability due to a high complex viscosity. Regarding the adhesive of Comparative Example 7, the performance as an adhesive was significantly decreased by adding a tackifying resin and a plasticizer. In contrast, the adhesive of Example 7 maintained a good performance as an adhesive even when the tackifying resin and the plasticizer were added thereto.

Furthermore, the adhesives of Examples 1 to 4 and Example 8 exhibited good peel strength also to polyethylene, which is an adherend having a low polarity, as compared with the adhesive of Comparative Example 5. Of these, the adhesives of Examples 4 and 8 prepared by using a block copolymer having a 2EHA monomer as the acrylic acid ester (B) exhibited particularly good peel strength to polyethylene.

INDUSTRIAL APPLICABILITY

The adhesive of the present invention can combine melt processability and holding power, and has good weather resistance, heat resistance, adhesiveness at low temperatures, and transparency. According to the present invention, it is possible to provide an adhesive and an adhesive product for which a hot-melt coating method, which does not require a step of drying an organic solvent or water and is advantageous in terms of energy saving and resource saving, can be employed as an adhesive processing method and which has good adhesive performance for a long period of time even in the environment where they are exposed to UV rays or even under the use environmental conditions at low temperatures.

The invention claimed is:
1. An adhesive comprising:
a block copolymer comprising at least one structure represented by formula (I):

-[A1]-[B/A2]-     (I)

wherein, in formula (I):
[A1] represents a polymer block comprising a structural unit derived from a methacrylic acid ester (A1), and
[B/A2] represents a copolymer block comprising a structural unit derived from an acrylic acid ester (B) and a structural unit derived from a methacrylic acid ester (A2), and the copolymer block [B/A2] comprises a gradient copolymer block section in which a copolymerization ratio of the methacrylic acid ester (A2) continuously increases from a section connected to the polymer block [A1];
wherein the block copolymer comprises:
a total content of the structural units derived from the methacrylic acid ester (A1) and the methacrylic acid ester (A2) of 5% to 60% by mass,
a weight-average molecular weight (Mw) of 30,000 to 300,000, and
a molecular weight distribution (Mw/Mn) of 1.0 to 1.5.
2. The adhesive according to claim 1, wherein the block copolymer is represented by formula (II):

[A1]-[B/A2]     (II).

3. The adhesive according to claim 1, wherein, in the block copolymer, a ratio of a monomer sequence distribution represented by formula (III) is 0.10 to 0.70:

AAB/(AAB+BAB)     (III)

wherein, in formula (III):
AAB represents a ratio of a triad monomer sequence of methacrylic acid ester (A)-methacrylic acid ester (A)-acrylic acid ester (B) in the block copolymer, and
BAB represents a ratio of a triad monomer sequence of acrylic acid ester (B)-methacrylic acid ester (A)-acrylic acid ester (B) in the block copolymer.
4. The adhesive according to claim 1, wherein the block copolymer forms a microphase separation structure.
5. The adhesive according to claim 1, wherein the polymer block [A1] has a glass transition temperature of 100° C. or higher, and the copolymer block [B/A2] has a glass transition temperature of 10° C. or lower.
6. The adhesive according to claim 1, wherein the total content of the structural units derived from the methacrylic acid ester (A1) and the methacrylic acid ester (A2) is 5% to 32% by mass.
7. The adhesive according to claim 1, wherein the molecular weight distribution (Mw/Mn) of the block copolymer is 1.0 to 1.3.
8. The adhesive according to claim 1, wherein the methacrylic acid ester (A1) and the methacrlylic acid ester (A2) are each methyl methacrylate.
9. The adhesive according to claim 1, wherein the acrylic acid ester (B) is a monomer selected from the group consisting of methyl acrylate, ethyl acrylate, n-butyl acrylate, 2-ethylhexyl acrylate, isooctyl acrylate, acrylate, and a mixture thereof.
10. The adhesive according to claim 9, wherein the acrylic acid ester (B) is a monomer mixture of two or more selected from the group consisting of methyl acrylate, ethyl acrylate, n-butyl acrylate, 2-ethylhexyl acrylate, isooctyl acrylate, and n-octyl acrylate.
11. The adhesive according to claim 1, wherein the polymer block [A1] has a triad syndiotacticity (rr) of 65% or more.
12. The adhesive according to claim 1, wherein the block copolymer is obtained by anionic polymerization in the presence of an organoaluminum compound.
13. The adhesive according to claim 1, further comprising at least one selected from the group consisting of acrylic resins, ethylene/vinyl acetate copolymer, acrylonitrile-styrene resin, polylactic acid and polyvinylidene fluoride.
14. The adhesive according to claim 1, further comprising at least one tackifying resin selected from the group consisting of rosin-containing resins, terpene-containing resins, petroleum resins, styrene-based resins, coumarone-indene-containing resins, phenolic resins, and xylene resins.
15. The adhesive according to claim 1, further comprising at least one selected from the group consisting of a plasticizer, heat stabilizer, light stabilizer, antistatic agent, flame retardant, blowing agent, colorant, dye, refractive index adjusting agent, filler, and curing agent.
16. A block copolymer, comprising:
at least one structure represented by formula (I):

-[A1]-[B/A2]-     (I)

wherein, in formula (I):
[A1] represents a polymer block comprising a structural unit derived from a methacrylic acid ester (A1), and
[B/A2] represents a copolymer block comprising a structural unit derived from an acrylic acid ester (B) and a structural unit derived from a methacrylic acid ester (A2), and the copolymer block [B/A2] comprises a gradient copolymer block section in which a copolymerization ratio of the methacrylic acid ester (A2) continuously increases from a section connected to the polymer block [A1]:

wherein the block copolymer comprises:

a total content of the structural units derived from the methacrylic acid ester (A1) and the methacrylic acid ester (A2) of 5% to 60% by mass, a weight-average molecular weight (Mw) of 30,000 to 300,000, and a molecular weight distribution (Mw/Mn) of 1.0 to 1.5.

* * * * *